United States Patent
Zhang et al.

(10) Patent No.: US 11,949,504 B2
(45) Date of Patent: Apr. 2, 2024

(54) TECHNIQUES FOR INDICATING DUPLEX MODE CAPABILITY

(71) Applicant: QUALCOMM Incorporated, San Diego, CA (US)

(72) Inventors: Qian Zhang, Basking Ridge, NJ (US); Yan Zhou, San Diego, CA (US); Peter Gaal, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/235,109

(22) Filed: Apr. 20, 2021

(65) Prior Publication Data

US 2022/0337339 A1 Oct. 20, 2022

(51) Int. Cl.
*H04L 1/00* (2006.01)
*H04L 5/14* (2006.01)
*H04W 8/24* (2009.01)
*H04W 72/23* (2023.01)

(52) U.S. Cl.
CPC .............. *H04L 1/0025* (2013.01); *H04L 5/14* (2013.01); *H04W 8/24* (2013.01); *H04W 72/23* (2023.01)

(58) Field of Classification Search
CPC combination set(s) only.
See application file for complete search history.

(56) References Cited

U.S. PATENT DOCUMENTS

| | | | | |
|---|---|---|---|---|
| 2015/0172038 A1* | 6/2015 | Jiang | ........................ | H04L 5/143 370/280 |
| 2017/0048839 A1* | 2/2017 | Henttonen | ............... | H04W 8/24 |
| 2019/0215112 A1* | 7/2019 | Chen | .................. | H04W 72/0446 |
| 2019/0357149 A1* | 11/2019 | Zhang | .................. | H04W 52/146 |
| 2020/0313837 A1* | 10/2020 | Vejlgaard | ............ | H04W 72/541 |
| 2022/0116881 A1* | 4/2022 | Shin | ....................... | H04W 52/48 |

FOREIGN PATENT DOCUMENTS

WO  WO-2020067821 A1  4/2020

OTHER PUBLICATIONS

International Search Report and Written Opinion—PCT/US2022/017751—ISA/EPO—dated May 27, 2022.

* cited by examiner

*Primary Examiner* — Kodzovi Acolatse
*Assistant Examiner* — Anindita Sen
(74) *Attorney, Agent, or Firm* — Holland & Hart LLP

(57) ABSTRACT

Methods, systems, and devices for wireless communications are described. A user equipment (UE) may transmit control signaling indicating a capability of the UE for supporting a first duplex mode and indicating a mode switching latency of the UE for switching between the first duplex mode and a second duplex mode. In some cases, the UE may transmit an indication of a set of supported full-duplex channel combinations, where each channel combination of the set of supported full-duplex channel combinations may include an uplink channel and a downlink channel. In some cases, the UE may transmit an indication of a duration for which the capability of the UE for supporting the first duplex mode is applicable. The UE may receive scheduling information based on the capability of the UE for supporting the first duplex mode and the mode switching latency, and communicate with a base station based on the scheduling information.

28 Claims, 15 Drawing Sheets

TECHNIQUES FOR INDICATING DUPLEX MODE CAPABILITY

FIELD OF TECHNOLOGY

The following relates to wireless communications, including techniques for indicating duplex mode capability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, wireless devices (e.g., a UE, a base station) may communicate using full-duplex communications, in which a device may transmit transmissions using a first antenna panel while concurrently receiving transmissions using a second antenna panel. Conventional techniques for full-duplex communications, however, may be improved.

SUMMARY

The described techniques relate to improved methods, systems, devices, and apparatuses that support techniques for indicating duplex mode capability. Generally, the described techniques provide for efficient methods of scheduling full-duplex or half-duplex communications with a device based on the capability of the device. For example, a user equipment (UE) may transmit control signaling (e.g., radio resource control (RRC) signaling, uplink control information (UCI) signaling, medium access control (MAC) control element (MAC-CE) signaling) indicating a capability of the UE for supporting a first duplex mode and indicating a mode switching latency of the UE for switching between the first duplex mode and a second duplex mode. The switching latency may indicate a duration of time associated with the UE switching from the first duplex mode to the second duplex mode, or from the second duplex mode to the first duplex mode, or both. For example, the UE may be communicating according to a full-duplex mode and the UE may determine to switch to a half-duplex mode. As such, the control signaling may indicate that the UE supports a half-duplex mode, or does not support a full-duplex mode, or both, where the first duplex mode may be the full-duplex mode, or the half-duplex mode. The control signaling, or some other signaling, may indicate the switching latency for switching from the full-duplex mode to the half-duplex mode. In another example, the UE may be communicating according to a half-duplex mode and the UE may determine to switch to a full-duplex mode. As such, the control signaling may indicate that the UE supports a full-duplex mode, or does not support a half-duplex mode, or both, where the first duplex mode may be the full-duplex mode, or the half-duplex mode. The control signaling, or some other signaling, may indicate the switching latency for switching from the half-duplex mode to the full-duplex mode.

In some cases, the UE may transmit an indication of a set of supported full-duplex channel combinations, where each channel combination of the set of supported full-duplex channel combinations includes an uplink channel and a downlink channel. In some cases, the UE may transmit an indication of a duration for which the capability of the UE for supporting the first duplex mode is applicable. In some cases, the duration may be a configured time-window, such that at the end of the configured time window, the UE may switch back to the previous duplex mode. In some cases, the indication of the duration may indicate that the UE may use a duplex mode for a duration until the UE transmits a subsequent control signal, where the subsequent control signal may indicate that the UE supports or does not support the first duplex mode. The UE may receive scheduling information based on the capability of the UE for supporting the first duplex mode and the mode switching latency, and communicate with a base station based on the scheduling information.

A method for wireless communications at a UE is described. The method may include transmitting control signaling indicating a capability of the UE for supporting a first duplex mode and indicating a mode switching latency of the UE for switching between the first duplex mode and a second duplex mode, receiving scheduling information based on the capability of the UE for supporting the first duplex mode and the mode switching latency, and communicating with a base station based on the scheduling information.

An apparatus for wireless communications at a UE is described. The apparatus may include a processor, memory coupled with the processor, and instructions stored in the memory. The instructions may be executable by the processor to cause the apparatus to transmit control signaling indicating a capability of the UE for supporting a first duplex mode and indicating a mode switching latency of the UE for switching between the first duplex mode and a second duplex mode, receive scheduling information based on the capability of the UE for supporting the first duplex mode and the mode switching latency, and communicate with a base station based on the scheduling information.

Another apparatus for wireless communications at a UE is described. The apparatus may include means for transmitting control signaling indicating a capability of the UE for supporting a first duplex mode and indicating a mode switching latency of the UE for switching between the first duplex mode and a second duplex mode, means for receiving scheduling information based on the capability of the UE for supporting the first duplex mode and the mode switching latency, and means for communicating with a base station based on the scheduling information.

A non-transitory computer-readable medium storing code for wireless communications at a UE is described. The code may include instructions executable by a processor to transmit control signaling indicating a capability of the UE for supporting a first duplex mode and indicating a mode switching latency of the UE for switching between the first duplex mode and a second duplex mode, receive scheduling information based on the capability of the UE for supporting the first duplex mode and the mode switching latency, and communicate with a base station based on the scheduling information.

In some examples of the method, apparatuses, and non-transitory computer-readable medium described herein, transmitting the control signaling may include operations, features, means, or instructions for transmitting an indication of a set of supported full-duplex channel combinations, where each channel combination of the set of supported full-duplex channel combinations includes an uplink channel and a downlink channel.

In some examples of the method, apparatuses, and non-transitory computer-readable medium described herein, the UE may be configured with a table of channel combinations, each channel combination in the table associated with an index, and transmitting the indication of the set of supported full-duplex channel combinations includes transmitting a set of indices associated with the set of supported full-duplex channel combinations.

In some examples of the method, apparatuses, and non-transitory computer-readable medium described herein, transmitting the control signaling may include operations, features, means, or instructions for transmitting an indication of a duration for which the capability of the UE for supporting the first duplex mode may be applicable.

In some examples of the method, apparatuses, and non-transitory computer-readable medium described herein, the duration includes a configured time window.

In some examples of the method, apparatuses, and non-transitory computer-readable medium described herein, the duration includes a time between transmission of the control signaling indicating the capability of the UE for supporting the first full duplex mode and transmission of subsequent control signaling.

Some examples of the method, apparatuses, and non-transitory computer-readable medium described herein may further include operations, features, means, or instructions for receiving control signaling indicating a capability of the base station for supporting the first duplex mode and indicating a mode switching latency of the base station for switching between the first duplex mode and the second duplex mode.

Some examples of the method, apparatuses, and non-transitory computer-readable medium described herein may further include operations, features, means, or instructions for receiving, from the base station, a message acknowledging the capability of the UE for supporting the first duplex mode.

Some examples of the method, apparatuses, and non-transitory computer-readable medium described herein may further include operations, features, means, or instructions for transmitting an indication of a reason for switching between the first duplex mode and the second duplex mode.

In some examples of the method, apparatuses, and non-transitory computer-readable medium described herein, the mode switching latency may be based on a directionality of duplex mode switching, the mode switching latency including a first mode switching latency associated with switching from the first duplex mode to the second duplex mode and including a second mode switching latency associated with switching from the second duplex mode to the first duplex mode.

In some examples of the method, apparatuses, and non-transitory computer-readable medium described herein, the capability of the UE for supporting the first duplex mode may be dynamic.

Some examples of the method, apparatuses, and non-transitory computer-readable medium described herein may further include operations, features, means, or instructions for determining to switch from the second duplex mode to the first duplex mode, where transmitting the control signaling indicating the capability of the UE for supporting the first duplex mode may be based on the determining.

Some examples of the method, apparatuses, and non-transitory computer-readable medium described herein may further include operations, features, means, or instructions for determining to switch from the second duplex mode to the first duplex mode may be based on a condition of one or more antenna panels of the UE.

In some examples of the method, apparatuses, and non-transitory computer-readable medium described herein, the control signaling includes a first message associated with indicating the capability of the UE for supporting the first duplex mode and a second message associated indicating the mode switching latency, the first message and the second message may be transmitted separately.

In some examples of the method, apparatuses, and non-transitory computer-readable medium described herein, transmitting the control signaling may include operations, features, means, or instructions for transmitting the control signaling in an RRC message, a MAC-CE message, or a UCI message, where the capability of the UE may be included in a new field, in unused bits of an existing field, in a new uplink control information format, or a combination thereof.

A method for wireless communications at a base station is described. The method may include receiving control signaling indicating a capability of a UE for supporting a first duplex mode and indicating a mode switching latency of the UE for switching between the first duplex mode and a second duplex mode, transmitting scheduling information based on the capability of the UE for supporting the first duplex mode and the mode switching latency, and communicating with the UE based on the scheduling information.

An apparatus for wireless communications at a base station is described. The apparatus may include a processor, memory coupled with the processor, and instructions stored in the memory. The instructions may be executable by the processor to cause the apparatus to receive control signaling indicating a capability of a UE for supporting a first duplex mode and indicating a mode switching latency of the UE for switching between the first duplex mode and a second duplex mode, transmit scheduling information based on the capability of the UE for supporting the first duplex mode and the mode switching latency, and communicate with the UE based on the scheduling information.

Another apparatus for wireless communications at a base station is described. The apparatus may include means for receiving control signaling indicating a capability of a UE for supporting a first duplex mode and indicating a mode switching latency of the UE for switching between the first duplex mode and a second duplex mode, means for transmitting scheduling information based on the capability of the UE for supporting the first duplex mode and the mode switching latency, and means for communicating with the UE based on the scheduling information.

A non-transitory computer-readable medium storing code for wireless communications at a base station is described. The code may include instructions executable by a processor to receive control signaling indicating a capability of a UE for supporting a first duplex mode and indicating a mode switching latency of the UE for switching between the first duplex mode and a second duplex mode, transmit scheduling information based on the capability of the UE for supporting the first duplex mode and the mode switching latency, and communicate with the UE based on the scheduling information.

In some examples of the method, apparatuses, and non-transitory computer-readable medium described herein, receiving the control signaling may include operations, features, means, or instructions for receiving an indication of a set of supported full-duplex channel combinations, where each channel combination of the set of supported full-duplex channel combinations includes an uplink channel and a downlink channel.

In some examples of the method, apparatuses, and non-transitory computer-readable medium described herein, the base station may be configured with a table of channel combinations, each channel combination in the table associated with an index, and receiving the indication of the set of supported full-duplex channel combinations includes receiving a set of indices associated with the set of supported full-duplex channel combinations.

In some examples of the method, apparatuses, and non-transitory computer-readable medium described herein, receiving the control signaling may include operations, features, means, or instructions for receiving an indication of a duration for which the capability of the UE for supporting the first duplex mode may be applicable.

In some examples of the method, apparatuses, and non-transitory computer-readable medium described herein, the duration includes a configured time window.

In some examples of the method, apparatuses, and non-transitory computer-readable medium described herein, the duration includes a time between transmission of the control signaling indicating the capability of the UE for supporting the first full duplex mode and transmission of subsequent control signaling.

Some examples of the method, apparatuses, and non-transitory computer-readable medium described herein may further include operations, features, means, or instructions for transmitting control signaling indicating a capability of the base station for supporting the first duplex mode and indicating a mode switching latency of the base station for switching between the first duplex mode and the second duplex mode.

In some examples of the method, apparatuses, and non-transitory computer-readable medium described herein, the capability of the base station for supporting the first duplex mode may be dynamic.

Some examples of the method, apparatuses, and non-transitory computer-readable medium described herein may further include operations, features, means, or instructions for transmitting, to the UE, a message acknowledging the capability of the UE for supporting the first duplex mode.

Some examples of the method, apparatuses, and non-transitory computer-readable medium described herein may further include operations, features, means, or instructions for receiving an indication of a reason for switching between the first duplex mode and the second duplex mode.

In some examples of the method, apparatuses, and non-transitory computer-readable medium described herein, the mode switching latency may be based on a directionality of duplex mode switching, the mode switching latency including a first mode switching latency associated with switching from the first duplex mode to the second duplex mode and including a second mode switching latency associated with switching from the second duplex mode to the first duplex mode.

In some examples of the method, apparatuses, and non-transitory computer-readable medium described herein, the control signaling includes a first message associated with indicating the capability of the UE for supporting the first duplex mode and a second message associated indicating the mode switching latency, the first message and the second message may be transmitted separately.

In some examples of the method, apparatuses, and non-transitory computer-readable medium described herein, receiving the control signaling may include operations, features, means, or instructions for receiving the control signaling in an RRC message, a MAC-CE message, or a UCI message, where the capability of the UE may be included in a new field, in unused bits of an existing field, in a new uplink control information format, or a combination thereof.

DETAILED DESCRIPTION

Figure 1:
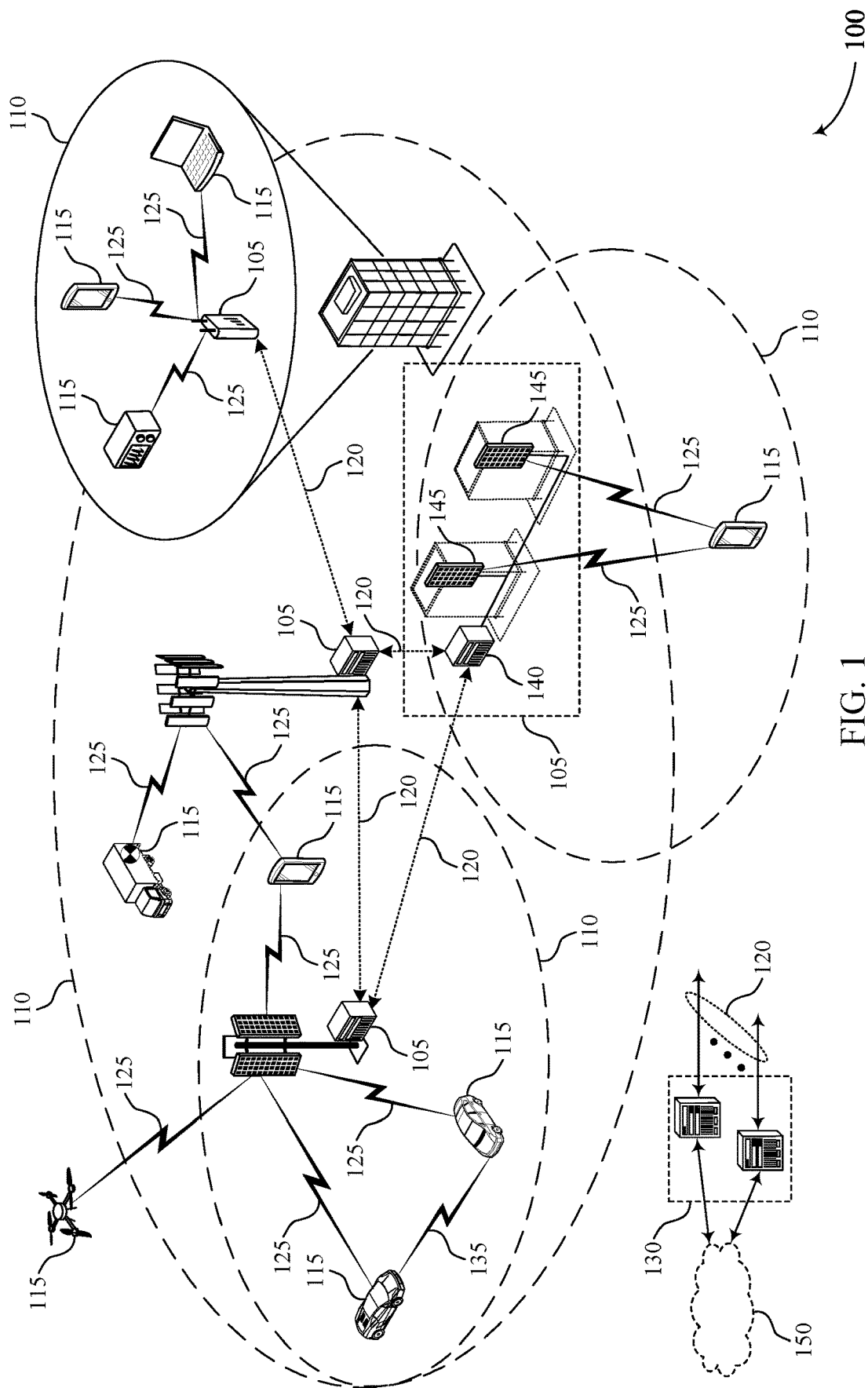
FIG. 1 illustrates an example of a wireless communications system that supports techniques for indicating duplex mode capability in accordance with aspects of the present disclosure.

Some wireless communications systems may support full-duplex communications between wireless devices (e.g., user equipment (UEs), base stations). For example, a UE may transmit an uplink message while simultaneously receiving a downlink message from a base station. In some cases, the UE, the base station, or both, may experience self-interference while performing full-duplex communications. For example, uplink signals generated at the UE may interfere with downlink signals arriving at the UE. As a result, the UE may be unable to successfully receive the downlink message from the base station. Likewise, if the base station transmits a downlink message while simultaneously receiving an uplink message from the UE, downlink signals generated at the base station may interfere with uplink signals arriving at the base station. Thus, self-interference may decrease the reliability and efficiency of full-duplex communications between the base station and the UE.

In some cases, the base station may employ various techniques to mitigate self-interference while performing full-duplex communications. For example, the base station may use different antenna panels to perform different full-duplex operations. That is, the base station may use a first antenna panel to perform uplink reception and may use a second antenna panel to perform downlink transmission. Additionally or alternatively, the base station may employ specialized hardware to reduce signal leakage between concurrent operations. However, such techniques may not be appropriate for some full-duplex UEs, which may have size restrictions, power constraints, and limited processing capabilities. Additionally or alternatively, strong self-interference may continue to occur in some cases. Additionally or alternatively, one or more of the antenna panels being used by the UE to perform the full-duplex operations may become overheated (e.g., overloaded) such as during a full-duplex operation.

To improve communications and user performance at a device (e.g., a UE, a base station), the device may be configured to switch between duplex modes. For example, a UE may be communicating with another device (e.g., another UE, a base station) in accordance with a full-duplex mode and the UE may determine (e.g., dynamically) that the UE can no longer support the full-duplex mode, or determine to switch to a half-duplex mode, or both. Accordingly, the UE may be configured to transmit a message (e.g., control signaling) to a base station (e.g., the serving base station of the UE) indicating the capability of the UE to support the full-duplex mode. For example, in the case that the UE determines that the UE does not support the full-duplex mode, the message may indicate the UE does not support the full-duplex mode, or that the UE supports a half-duplex mode, or both. In some cases, the message may inform the base station that the UE is switching duplex modes (e.g., autonomously), or may include a request to the base station to allow the UE to switch modes.

In some cases, the UE may transmit an indication of a duration for which the capability of the UE for supporting the first duplex mode is applicable. In some cases, the duration may be a configured time-window (e.g., an amount of time expressed in transmission time intervals (TTIs), slots, symbols, second, milliseconds, micro-seconds, minutes) such that at the end of the configured time window, the UE may switch back to the previous duplex mode (e.g., a second duplex mode). For example, the UE may switch from a full-duplex mode to a half-duplex mode for the configured time, and at the end of the configured time window, the UE may switch back to the full-duplex mode and the base station may schedule communications with the UE in accordance with the full-duplex mode at the end of the time window. In some cases, the indication of the duration may indicate that the UE may use a first duplex mode for a duration until the UE transmits a subsequent control signal, where the subsequent control signal may indicate that the UE supports or does not support the first duplex mode. For example, the UE may switch from a full-duplex mode to a half-duplex mode and the UE may continue to operate according to the half-duplex mode until the UE determines to switch modes. Upon determining to switch modes, the UE may transmit a message to the base station indicating the new capability of the UE and as such, the base station may receive the message indicating the new capability of the UE and schedule communications with the UE accordingly.

In some cases, switching from the half-duplex mode to the full-duplex mode, or vice versa, may take an amount of time, referred to as switching latency. As such, upon receiving the message indicating the capability of the UE to support a duplex mode, the base station may need to account for the switching latency of the UE before scheduling the UE in accordance with the duplex mode the UE is switching to. In some cases, the base station may be unaware of the UE's switching latency. As such, the UE may transmit an indication of the switching latency of the UE. In some cases, the UE may indicate the switching latency of the UE associated with switching from a full-duplex mode to a half-duplex mode, or the switching latency of the UE associated with switching from a half-duplex mode to a full-duplex mode, or both. Accordingly, the UE may receive scheduling information based on the capability of the UE and the mode switching latency, and communicate with a base station based on the scheduling information.

Particular aspects of the subject matter described herein may be implemented to realize one or more advantages. The described techniques may support improvements in communicating according to a full-duplex mode by improving flexibility, and improving reliability, among other advantages. As such, supported techniques may include improved network operations and, in some examples, may promote network efficiencies, among other benefits.

Aspects of the disclosure are initially described in the context of wireless communications systems. Aspects are the described with reference to a process flow. Aspects of the disclosure are further illustrated by and described with reference to apparatus diagrams, system diagrams, and flowcharts that relate to techniques for indicating duplex mode capability.

FIG. 1 illustrates an example of a wireless communications system 100 that supports techniques for indicating duplex mode capability in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as a wireless communications system 100, a UE 115 may transmit, to a base station 105, control signaling (e.g., radio resource control (RRC) signaling, uplink control information (UCI) signaling, medium access control (MAC) control element (MAC-CE) signaling) indicating a capability of the UE 115 for supporting a first duplex mode (e.g., a full-duplex mode, a half-duplex mode) and indicating a mode switching latency of the UE 115 for switching between the first duplex mode and a second duplex mode (e.g., a full-duplex mode, a half-duplex mode). The switching latency may indicate a duration of time associated with the UE 115 switching from the first duplex mode to the second duplex mode, or from the second duplex mode to the first duplex mode, or both. For example, the UE 115 may be communicating according to a full-duplex mode and the UE 115 may determine to switch to a half-duplex mode. As such, the control signaling may indicate that the UE 115 supports a half-duplex mode, or does not support a full-duplex mode, or both and the control signaling may indicate the switching latency for switching from the full-duplex mode to the half-duplex mode. In another example, the UE 115 may be communicating according to a half-duplex mode and the UE 115 may determine to switch to a full-duplex mode. As such, the control signaling may indicate that the UE 115 supports the full-duplex mode, or does not support the half-duplex mode, or both and the control signaling may indicate the switching latency for switching from the half-duplex mode to the full-duplex mode.

In some cases, the UE 115 may transmit an indication of a set of supported full-duplex channel combinations, where each channel combination of the set of supported full-duplex channel combinations includes an uplink channel and a downlink channel. In some cases, the UE 115 may transmit an indication of a duration for which the capability of the UE 115 for supporting the first duplex mode is applicable. In some cases, the duration may be a configured time-window, such that at the end of the configured time window, the UE 115 may switch back to the previous duplex mode. In some cases, the indication of the duration may indicate that the UE 115 may use a duplex mode for a duration until the UE 115 transmits a subsequent control signal, where the subsequent control signal may indicate that the UE 115 supports or does not support the first duplex mode. The UE 115 may receive scheduling information based on the capability of the UE 115 for supporting the first duplex mode and the mode switching latency, and communicate with a base station 105 based on the scheduling information.

Figure 2:
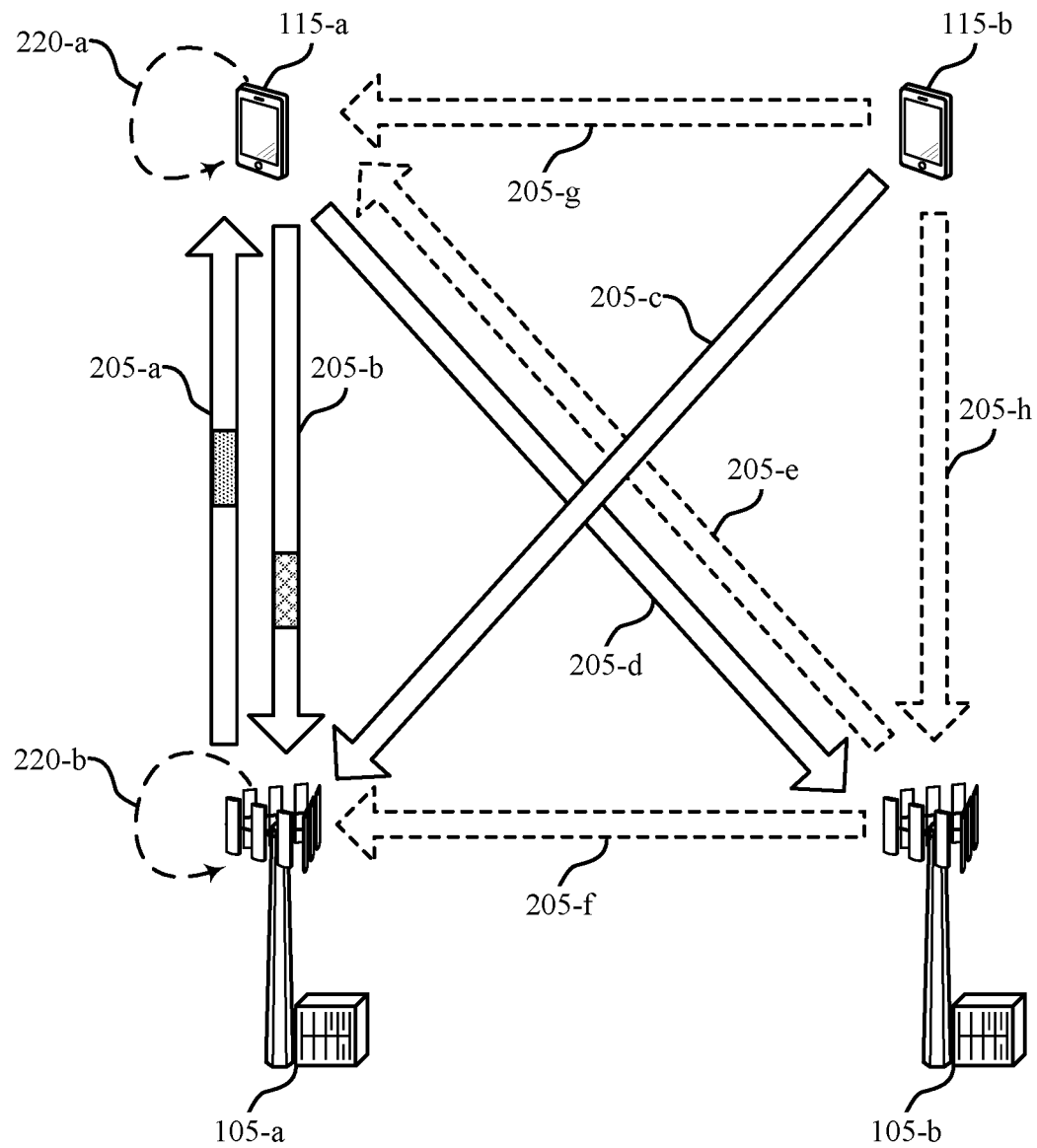
FIG. 2 illustrates an example of a wireless communications system that supports techniques for indicating duplex mode capability in accordance with aspects of the present disclosure.

FIG. 2 illustrates an example of a wireless communications system 200 that supports techniques for indicating duplex mode capability in accordance with aspects of the present disclosure. The wireless communications system 200 may include base stations 105-*a* and 105-*b* and UEs 115-*a* and 115-*b*, which may be examples of base stations 105 and UEs 115 as described with reference to FIG. 1. Base station 105-*a* and base station 105-*b* may each serve a geographic coverage area, where the geographic coverage areas may overlap. In some cases, UE 115-*a* may implement a duplex capability indication procedure to assist scheduling UE 115-*a* to communicate with one or more other devices (e.g., UE 115-*b*, base station 105-*a*, base station 105-*b*). Additionally or alternatively, other wireless devices, such as base stations 105-*a*, 105-*b*, or UE 115-*b*, or some combination of these devices, may implement a duplex capability indication procedure.

In some examples, the wireless communications system 200 may support different duplex modes. For example, the UE 115-*a* may operate according to one of a half-duplex mode or a full-duplex mode. In a full-duplex mode, the UE 115-*a* may transmit and receive concurrently (e.g., on the same time resources). In some examples, in a full-duplex mode, the UE 115-*a* may transmit and receive signaling on the same time resources and on partially or fully overlapping frequency resources. In a half-duplex mode, the UE 115-*a* may transmit and receive on different time resources. Base station 105-*a*, base station 105-*b*, UE 115-*b*, or some combination thereof may support a full-duplex mode, or a half-duplex mode. To support full-duplex operation, a device (e.g., UE 115, base station 105) may transmit uplink signals using a first antenna panel and receive downlink signals using a second antenna panel.

Some devices may be configured with the ability to support full-duplex operations, and some devices may not be configured with the ability to support full-duplex operations. As such, a device may indicate to one or more other devices whether the device supports full-duplex operations. In some cases, the device may transmit the indication upon initial communications with another device (e.g., statically signal). For example, UE 115-*a* may support full-duplex operations, and upon connecting to base station 105-*a*, UE 115-*a* may transmit an indication to base station 105-*a* that UE 115-*a* may communicate in accordance with full-duplex operations. As such, base station 105-*a* (e.g., a serving base station 105 of UE 115-*a*) may schedule UE 115-*a* to transmit and receive (e.g., sense) communications in one or more overlapping instances. Full-duplex operations may reduce latency in some wireless communication systems because a device may receive a downlink signal in uplink (e.g., uplink only) resource allocations (e.g., slots). Further, full-duplex operations may improve spectrum efficiency per cell, per UE 115, or both and may provide for efficient resource utilization.

For example, while operating according to a full-duplex mode, a device, such as UE 115-*a*, may simultaneously transmit an uplink (or sidelink) transmission to a first device (e.g., another UE 115 such as UE 115-*b*, or a base station 105, such as base station 105-*a* or base station 105-*b*), and receive a downlink (or sidelink) transmission from a second device (e.g., another UE 115 such as UE 115-*b*, or a base station 105, such as base station 105-*a* or base station 105-*b*). For example, UE 115-*a* may transmit an uplink transmission to base station 105-*b* via communication link 205-*d*, and simultaneously (e.g., in one or more overlapping resources) receive a downlink transmission from base station 105-*a* via communication link 205-*a*, where UE 115-*a* may transmit the uplink transmission using a first antenna panel and may receive the downlink transmission using a second antenna panel. The first antenna panel and the second antenna panel may be the same, partially the same, or different.

In another example, a device, such as UE 115-*a*, may simultaneously transmit an uplink transmission to a first device (e.g., another UE 115 such as UE 115-*b*, or a base station 105, such as base station 105-*a* or base station 105-*b*), and receive a downlink transmission from the same first device (e.g., another UE 115 such as UE 115-*b*, or a base station 105, such as base station 105-*a* or base station 105-*b*). For example, UE 115-*a* may transmit an uplink transmission to base station 105-*a* via communication link 205-*b*, and simultaneously (e.g., in one or more overlapping resources) receive a downlink transmission from base station 105-*a* via communication link 205-*a*.

In another example, a device, such as base station 105-*a*, may simultaneously transmit a downlink transmission to a first device (e.g., a UE 115 such as UE 115-*a* or UE 115-*b*, or another base station 105, such as base station 105-*b*), and receive an uplink transmission from a second device (e.g., a UE 115 such as UE 115-*a* or UE 115-*b*, or another base station 105, such as base station 105-*b*). For example, base station 105-*a* may transmit a downlink transmission to UE 115-*a* via communication link 205-*a*, and simultaneously (e.g., in one or more overlapping resources) receive an uplink transmission from UE 115-*b* via communication link 205-*c*, where base station 105-*a* may transmit the downlink transmission using a first antenna panel and may receive the uplink transmission using a second antenna panel. The first antenna panel and the second antenna panel may be the same, partially the same, or different. However, the techniques described herein are not limited to the described examples. A device may perform full-duplex communications with any number of devices, and with any type of device.

As described herein, a wireless communications system may support full-duplex devices and half-duplex devices. As such, a full-duplex device may communicate with another full-duplex device or with a half-duplex device, or both. For example, UE 115-*a* and base station 105-*a* may be full-duplex devices (e.g., devices that support full-duplex operations), and UE 115-*b* and base station 105-*b* may be half-duplex devices (e.g., devices that support half-duplex operations). In some implementations, UE 115-*a* may communicate (e.g., transmit or receive transmissions) with base station 105-*b*. In some implementations, UE 115-*a* may communicate (e.g., transmit or receive transmissions) with base station 105-*a*. In some implementations, UE 115-*a* may communicate (e.g., transmit or receive transmissions) with UE 115-*b*. In some implementations, UE 115-*b* may communicate (e.g., transmit or receive transmissions) with base station 105-*a*, base station 105-*b* (e.g., via communication link 205-*h*), or UE 115-*a*, or a combination thereof. In some implementations, base station 105-*a* may communicate (e.g., transmit or receive transmissions) with base station 105-*b*, UE 115-*a*, UE 115-*b*, or a combination thereof. In some implementations, base station 105-*b* may communicate (e.g., transmit or receive transmissions) with base station 105-*a*, UE 115-*a*, UE 115-*b*, or a combination thereof.

However, in some cases, simultaneously transmitting and sensing may introduce some interference 220 (e.g., self-interference) at a device which may negatively impact the ability of the device to transmit and/or the ability of the device to perform channel sensing. For example, in some cases, UE 115-*a* may experience interference 220-*a* from the uplink to the downlink, or vice versa. In some cases, the interference 220 may be caused due to scheduled communications. For example, uplink transmissions in communication links 205-*b* and/or 205-*d* may impact the ability of UE 115-*a* to receive the downlink transmission in communication link 205-*a*, or vice versa, thereby causing interference 220-*a*. In some cases, the interference 220 may be caused due to one or more signals transmitted via neighboring devices that are not intended for the device experiencing the interference 220. For example, UE 115-*a* may receive unexpected signals via communication links 205-*e* and/or 205-*g* that may impact the ability of UE 115-*a* to transmit scheduled transmissions (e.g., uplink or sidelink transmissions) and/or receive scheduled transmission (e.g., downlink, or sidelink transmissions).

In another example, base station 105-*a* may experience interference 220-*b* from the downlink to uplink, or vice versa. In some cases, the interference 220 may be caused due to scheduled communications. For example, transmission in communication links 205-*a* may impact the ability of base station 105-*a* to receive the transmissions in communication links 205-*b*, and/or 205-*c*, or vice versa, thereby causing interference 220-*b*. In some cases, the interference 220 may be caused due to one or more signals transmitted via neighboring devices that are not intended for the device experiencing the interference 220. For example, base station 105-*a* may receive unexpected signals via communication link 205-*f* that may impact the ability of base station 105-*a* to transmit scheduled transmissions (e.g., downlink transmissions) and/or receive scheduled transmissions (e.g., downlink, or uplink transmissions).

In some cases, the interference 220 may cause the device to make inaccurate signal strength measurements associated with the reference signaling. For example, the interference 220 may increase a reference signal received power (RSRP) measurement, and the device experiencing the interference 220 may incorrectly assume that fewer resources are available than if the interference 220 had not occurred. Additionally or alternatively, one or more conditions at the device may change and the performance of the device may be improved by operating according to a half-duplex mode, such that the device may transmit and receive signals at different occasions, but not at the same time. For example, the device may experience strong self-interference, such as due to clutter echo. In such cases, an signal-to-noise ratio (SINR) threshold may not be met. In some other examples, the transmitting antenna panel and/or the receiving antenna panel may over-heat, or the device may become overloaded, such as due to ongoing transmissions in multiple carriers.

Accordingly, in such cases, the full-duplex supported device may benefit from switching to a half-duplex mode.

As such, a device (e.g., a UE 115, or base station 105) that is configured to perform full-duplex operations may determine whether the device is capable of supporting the full-duplex communications and to indicate such capability to one or more other devices the device is communicating with. The duplex mode capability of the device may be static such that the capability of the device to support a duplex mode may not change, or the duplex mode capability may by dynamic such that the capability of the device to support a duplex mode may change over time (e.g., as communication parameters change, as the duration for operating in a full-duplex mode increases). In some cases, the device may be configured to determine duplex mode capability dynamically (e.g., as one or more communications parameters change), semi-statically (e.g., every x milliseconds, for example, the device may determine duplex mode capability), or aperiodically. For example, UE 115-*a* may determine that the SINR threshold may not be met by any beam pairs for full-duplex communications. As such, the UE may determine to switch duplex modes and may transmit a message (e.g., a capability report) indicating that UE 115-*a* does not currently have full-duplex capability. In another example, UE 115-*a* may determine that one or more antenna panels of UE 115-*a* is overheating (e.g., approaching a heat threshold). Therefore, in order to mitigate damage to the panel (e.g., or to the RF), UE 115-*a* may transmit a message (e.g., a capability report) indicating that UE 115-*a* does not currently have full-duplex capability so that UE 115-*a* may deactivate the overheated panel for a duration of time to allow the panel to decrease in temperature.

Therefore, a device may dynamically determine whether it supports full-duplex operations and may transmit (e.g., dynamically, aperiodically, semi-persistently) an indication of such capability to one or more other devices. The device may transmit the indication in RRC, MAC-CE, UCI, DCI, a capability report (e.g., a UE capability report), etc. In some cases, the device may transmit the indication to the base station 105 scheduling the device, or the device may transmit the indication to each device (e.g., UE 115, base station 105) the device is communicating with. For example, UE 115-*a* may transmit capability information 210 to at least base station 105-*a* (e.g., the serving base station 105 of UE 115-*a*). In some cases, UE 115-*a* may transmit the capability information 210 to base station 105-*a*, UE 115-*b*, base station 105-*b*, or a combination thereof. In some cases, the device may initially indicate, aperiodically (e.g., in UE capability signaling), to one or more other devices whether the device can support full-duplex operations (e.g., whether the device is configured as a full-duplex device) and the device may transmit dynamic or semi-persistent capability information 210 (e.g., in MAC-CE, UCI, DCI) as the capability of the device changes over time, or with changing communication parameters, or both. In some cases, the device may indicate, such as in the capability information 210 message, a reason that the device is switching duplex modes (e.g., reason code). For example, UE 115-*a* may indicate that UE 115-*a* is switching from a full-duplex mode to a half-duplex mode because UE 115-*a* is overloaded, is experiencing strong self-interference, an antenna panel of UE 115-*a* is overheating, or a combination thereof.

In some implementations, the capability information 210 may be a request for the device to switch duplex modes. For example, UE 115-*a* may transmit capability information 210 to base station 105-*a*, where the capability information 210 may indicate that UE 115-*a* is overloaded by full-duplex operations, that UE 115-*a* may benefit from switching to a half-duplex mode, or request that UE 115-*a* may switch to a half-duplex mode, or a combination thereof. Base station 105-*a* may receive the capability information 210 and grant or deny the request for UE 115-*a* to switch duplex modes. In some cases, base station 105-*a* may transmit a message to UE 115-*a* indicating whether UE 115-*a* may switch duplex modes.

In some implementations, the capability information 210 may be used to indicate the device is going to or has already switched duplex modes. For example, UE 115-*a* may (e.g., dynamically, semi-statically, or aperiodically) determine to switch duplex modes, and may transmit capability information 210 to inform base station 105-*a* that UE 115-*a* has already, or will at an certain time, switch to a different duplex mode. As such, base station 105-*a* may schedule UE 115-*a* based on the new duplex mode.

The device may indicate (e.g., request) an amount of time that the device may use the new duplex mode. The device may include this indication in the capability information 210 or in a different message. In some implementations, the device may indicate a time window for operating according to the new duplex mode. In some cases, the device may indicate the time window as a duration, such as by a number of microseconds, milliseconds, slots, symbols, TTIs, etc. In some cases, the device may indicate the time window as a starting point (e.g., start time) and ending point (e.g., end time). At the end of such time window, the device may switch back to the previous duplex mode (e.g., autonomously) and the scheduling device may schedule the device accordingly (e.g., without additional signaling). In some implementations, the device may indicate that the device may operate according to the new duplex mode until further notice. For example, UE 115-*a* may determine to switch to a half-duplex mode and may determine to operate according to the half-duplex mode until UE 115-*a* makes a second determination to switch back to a full-duplex mode. At which point, UE 115-*a* may transmit a second capability information 210 message to base station 105-*a* indicating the updated capability of UE 115-*a*. As such, UE 115-*a* may operate according to the half-duplex mode until transmitting the second capability information 210. In some cases, UE 115-*a* may indicate (e.g., in the capability information 210) that UE 115-*a* plans to operate according to the half-duplex mode until UE 115-*a* determines that the capability of UE 115-*a* has changed to base station 105-*a* or base station 105-*a* may be configured (e.g., by default) to identify that UE 115-*a* may operate in the new duplex mode until receiving a second capability information 210 message.

In some cases, switching from the half-duplex mode to the full-duplex mode, or vice versa, may take an amount of time, referred to as switching latency (e.g., preparation time). For example, to switch from a half-duplex mode, to a full-duplex mode, the device may need to configure (e.g., turn on) a second antenna panel so that the device may transmit using one antenna panel and receive using another antenna panel. Additionally or alternatively, switching latency may be based on subcarrier spacing. As such, upon receiving the message indicating the capability of the device to support a duplex mode, the base station 105 (e.g., the serving base station of the device) may need to account for the switching latency of the device before scheduling the device in accordance with the duplex mode the device is switching to. In some cases, the base station 105 may be unaware of the UE's switching latency. As such, the device may transmit an indication of the switching latency of the device to the base station 105. Additionally or alternatively, the device may transmit the indication of the switching latency to one or more other devices the device is communicating with, or neighboring devices, etc. For example, UE 115-*a* may transmit the switching latency of UE 115-*a* to base station 105-*a* (e.g., the serving base station 105-*a* of UE 115-*a*), to UE 115-*b*, to base station 105-*b*, or a combination thereof. In some cases, the device may indicate a first switching latency of the device associated with switching from a full-duplex mode to a half-duplex mode, or a second switching latency of the device associated with switching from a half-duplex mode to a full-duplex mode, or both. The device may indicate the first switching latency, or the second switching latency, or both. The first switching latency and the second switching latency may be the same or different. In some cases, the second switching latency may be greater than the first switching latency. In some cases, the first switching latency may be equal, or near equal to zero milliseconds as the device may be able to continue communications while switching to a half-duplex mode (e.g., turning at least one antenna panel off). The device may include the first switching latency, or the second switching latency, or both in the capability information 210 transmission. In some implementations, the device may only include the switching latency associated with the switching direction the device is performing. For example, UE 115-*a* may determine to switch from a half-duplex mode to a full-duplex mode. As such, UE 115-*a* may transmit capability information 210 to at least base station 105-*a* indicating the duplex mode capability of UE 115-*a*. UE 115-*a* may also include an indication of the second switching latency of UE 115-*a* (e.g., the latency associated with switching from a half-duplex mode to a full-duplex mode). In some cases, the device may indicate the first switching latency, or the second switching latency, or both upon initial connection establishment with a device. For example, UE 115-*a* may perform a handover procedure, or otherwise connect with base station 105-*a*, and upon such initial connection, UE 115-*a* may transmit an indication of the first switching latency, or the second switching latency, or both of UE 115-*a* to base station 105-*a*.

A scheduling device may schedule communications based on the switching latency of a device. For example, UE 115-*a* may transmit the switching latency associated with UE 115-*a* to base station 105-*a* and base station 105-*a* may schedule communications with UE 115-*a* at the end of the switching latency so as to allow UE 115-*a* to prepare for the new duplex mode (e.g., turning on or off antenna panels).

In some implementations, the device may indicate one or more channel combinations for which the device may operate according to a full-duplex mode (e.g., full-duplex supported channel combinations). Each channel combination may include at least two of an uplink channel, a downlink channel, or a sidelink channel. For example, the device may indicate a set of channel combinations supported for full-duplex operation, where each channel combination may indicate an uplink channel/downlink channel, downlink channel/uplink channel, sidelink channel/uplink channel, downlink channel/sidelink channel, etc. For example, the channel combinations that a device may support but may not be limited to include: control channel/control channel, reference signal channel/reference signal channel, data channel/data channel, data channel/control channel, control channel/data channel, reference signal channel/data channel, data channel/reference signal channel, random access channel/data channel, random access channel/control channel, data channel/random access channel, control channel/random access channel, etc.

In some cases, the device may be configured (e.g., aperiodically, semi-statically, or dynamically) with a table of channel combinations, where each channel combination in the table is associated with an index. As such, to indicate the set of supported full-duplex channel combinations the device may transmit a set of indices associated with the set of supported full-duplex channel combinations. A scheduling device may receive the set of channel combinations and schedule the device accordingly. For example, UE 115-*a* may transmit the set of supported full-duplex channel combinations to base station 105-*a* and base station 105-*a* may schedule UE 115-*a* to communicate according to a full-duplex mode for the set of supported full-duplex channel combinations and schedule UE 115-*a* to communicate according to a half-duplex mode for any other type of communications. For example, if UE 115-*a* supports full-duplex communications for only control channel/control channel, base station 105-*a* may not schedule UE 115-*a* to perform simultaneous control channel transmissions and data channel receptions (e.g., control channel/data channel).

The device may transmit an indication of full-duplex supported channel combinations aperiodically (e.g., in RRC), semi-statically (e.g., in MAC-CE), or dynamically (e.g., in UCI, or DCI). For example, in some cases, the full-duplex channel combinations supported by a device may not change, and thus the device may indicate the full-duplex supported channel combinations aperiodically (e.g., upon connection establishment). In another example, the full-duplex channel combinations supported by a device may change, and thus the device may indicate the full-duplex supported channel combinations semi-persistently, or dynamically. In some cases, the device may include the full-duplex supported channel combinations in the capability information 210 message, or in a different message.

In some cases, devices communicating with each other may exchange duplex capability information. For example, UE 115-*a* and UE 115-*b* may exchange duplex capability information. In another example, UE 115-*a* and base station 105-*a* may exchange duplex capability information. For example, UE 115-*a* may transmit capability information 210 to base station 105-*a* indicating the capability of UE 115-*a* to support a duplex mode, one or more switching latencies, a duration for supporting the duplex mode, full-duplex supported channel combinations, etc. and base station 105-*a* may transmit capability information associated with base station 105-*a* to UE 115-*a* indicating the capability of base station 105-*a* to support a duplex mode, one or more switching latencies, a duration for supporting the duplex mode, full-duplex supported channel combinations, etc. Upon receiving the capability information 210 of a device, a scheduling device may schedule communications with the device accordingly. For example, upon receiving capability information 210 from UE 115-*a*, base station 105-*a* may determine and transmit scheduling information 215 to UE 115-*a*, where the schedule information 215 may be based on the duplex mode capability of UE 115-*a*.

Figure 3:
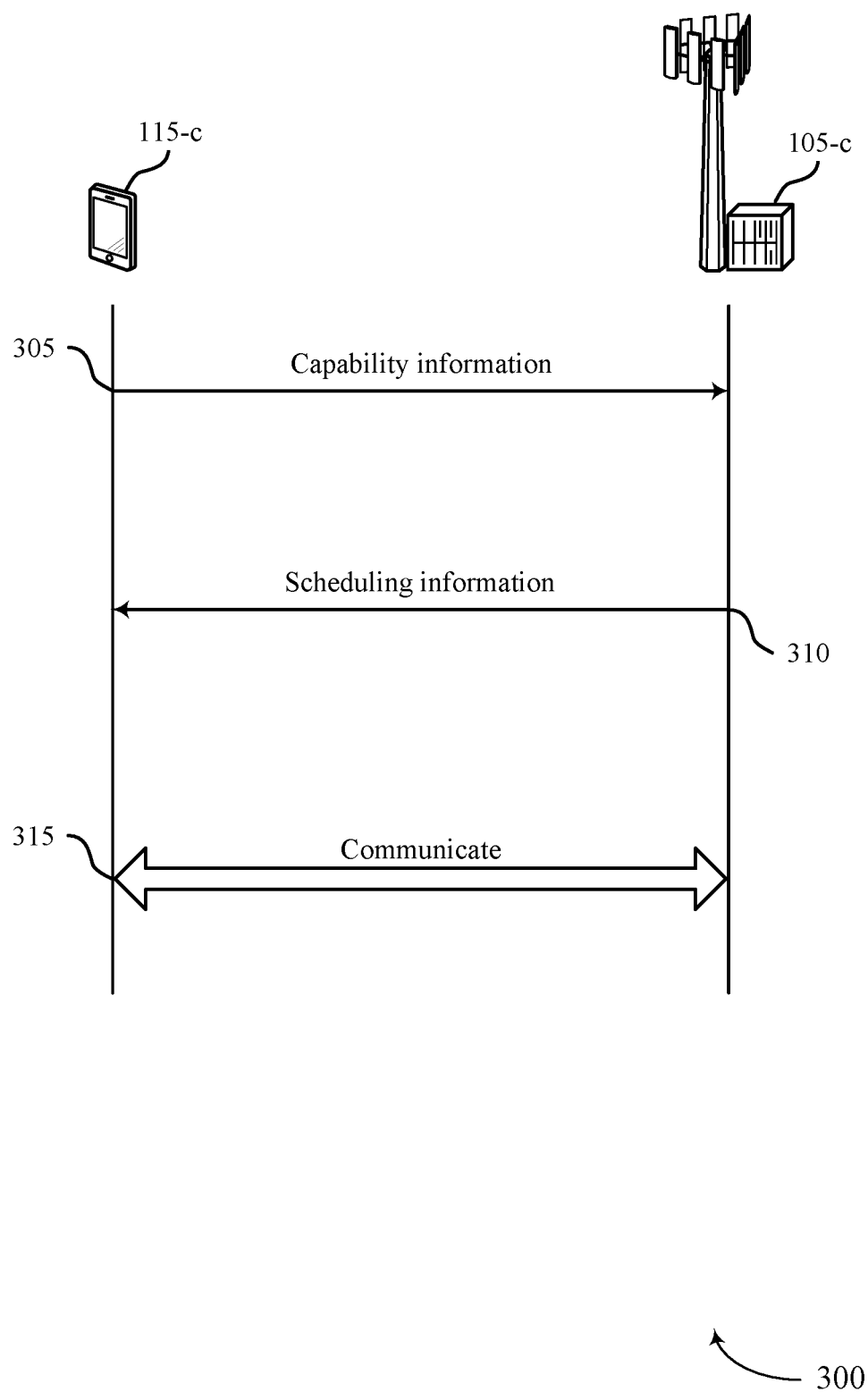
FIG. 3 illustrates an example of a process flow that supports techniques for indicating duplex mode capability in accordance with aspects of the present disclosure.

FIG. 3 illustrates an example of a process flow 300 that supports techniques for indicating duplex mode capability in accordance with aspects of the present disclosure. The process flow 300 may illustrate an example duplex mode determination and duplexing indication procedure. For example, UE 115-*c* may transmit duplexing capability information to base station 105-*c*. Base station 105-*c* and UE 115-*c* may be examples of the corresponding wireless devices described with reference to FIGS. 1 and 2. In some cases, instead of UE 115-*c* implementing the duplexing capability indication procedure, a different type of wireless device (e.g., a base station 105) may perform the same or a similar procedure. Alternative examples of the following may be implemented, where some steps are performed in a different order than described or are not performed at all. In some cases, steps may include additional features not mentioned below, or further steps may be added.

At 305, UE 115-*c* may transmit control signaling (e.g., RRC signaling, UCI signaling, MAC-CE signaling) indicating a capability of UE 115-*c* for supporting a first duplex mode (e.g., a full-duplex mode, a half-duplex mode) and indicating a mode switching latency of UE 115-*c* for switching between the first duplex mode and a second duplex mode (e.g., a full-duplex mode, a half-duplex mode). The capability of UE 115-*c* for supporting the first duplex mode may be dynamic. The mode switching latency may be based on a directionality of duplex mode switching. The mode switching latency may include a first mode switching latency associated with switching from the first duplex mode to the second duplex mode or may include a second mode switching latency associated with switching from the second duplex mode to the first duplex mode, or both. The control signaling may include at least a first message associated with indicating the capability of UE 115-*c* for supporting the first duplex mode and a second message associated indicating the mode switching latency. The first message and the second message may be transmitted at the same time, or separately. In some implementations, the capability of UE 115-*c* may be included in a new field, in unused bits of an existing field, in a new uplink control information format, or a combination thereof.

In some cases, UE 115-*c* may determine to switch from the second duplex mode to the first duplex mode, where transmitting the control signaling indicating the capability of UE 115-*c* for supporting the first duplex mode is based on the determining. Determining to switch from the second duplex mode to the first duplex mode may be based on a condition of one or more antenna panels of UE 115-*c*, or based on some other communication parameter at UE 115-*c*.

In some implementations, UE 115-*c* may transmit an indication of a duration for which the capability of UE 115-*c* for supporting the first duplex mode is applicable. In some cases, the duration may be a configured time window (e.g., a duration of time in seconds, milliseconds, or a number of time resources such as slots, TTIs, symbols, or may be defined by a starting point and an ending point). In some cases, the duration may be a time between transmission of the control signaling indicating the capability of UE 115-*a* for supporting the first full-duplex mode (e.g., at 305) and transmission of subsequent control signaling.

In some cases, UE 115-*c* may receive, from base station 105-*b*, a message acknowledging the capability of UE 115-*c* for supporting the first duplex mode. In some cases, the indication of the capability of UE 115-*a* may include a request for UE 115-*c* to switch duplex modes. As such, UE 115-*c* may receive an message indicating whether UE 115-*c* may switch modes. In some implementations, UE 115-*c* may transmit an indication of a reason for switching between the first duplex mode and the second duplex mode (e.g., a reason code).

In some cases, UE 115-*c* may transmit an indication of a set of supported full-duplex channel combinations, where each channel combination of the set of supported full-duplex channel combinations comprises an uplink channel and a downlink channel. For example, UE 115-*c* may indicate that UE 1115-*c* supports full-duplex operations for simultaneous uplink and downlink control transmissions, for simultaneous uplink and downlink reference signal transmissions, simultaneous uplink and downlink data transmissions, etc. In some implementations, UE 115-*c* may be configured with a table of channel combinations, where each channel combination in the table may be associated with an index. As such, UE 115-*c* may transmit the indication of the set of supported full-duplex channel combinations by transmitting a set of indices associated with the set of supported full-duplex channel combinations.

In some implementations, UE 115-*c* may receive control signaling indicating a capability of base station 105-*c* for supporting the first duplex mode and indicating a mode switching latency of base station 105-*c* for switching between the first duplex mode and the second duplex mode.

At 310, UE 115-*c* may receive, from base station 105-*c*, scheduling information based on the capability of UE 115-*c* for supporting the first duplex mode and the mode switching latency.

At 315, UE 115-*c* may communicate (e.g., transmit, receive) with at least base station 105-*c* based on the scheduling information.

Figure 4:
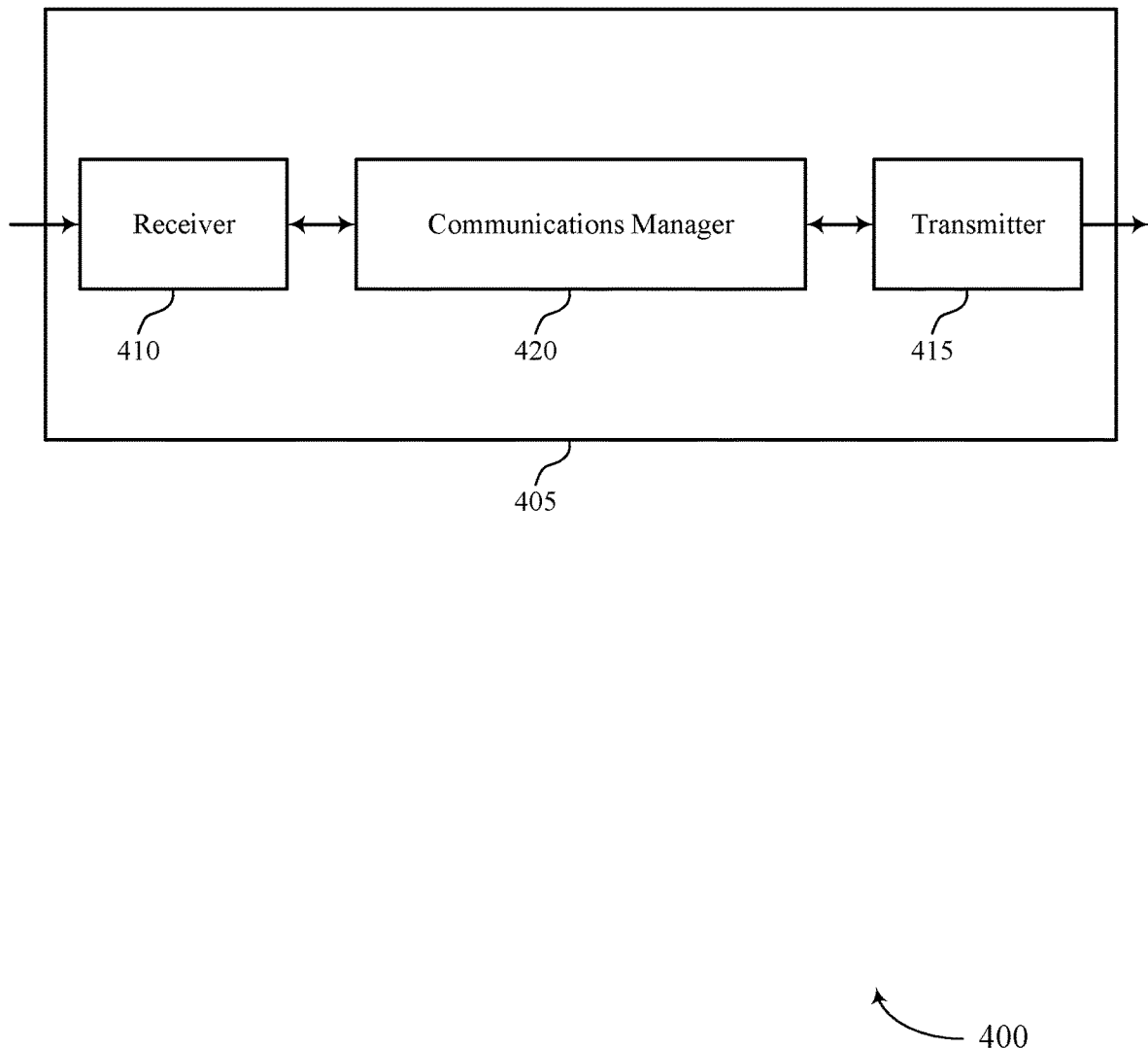
FIGS. 4 and 5 show block diagrams of devices that support techniques for indicating duplex mode capability in accordance with aspects of the present disclosure.

FIG. 4 shows a block diagram 400 of a device 405 that supports techniques for indicating duplex mode capability in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for indicating duplex mode capability). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for indicating duplex mode capability). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for indicating duplex mode capability as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for transmitting control signaling indicating a capability of the UE for supporting a first duplex mode and indicating a mode switching latency of the UE for switching between the first duplex mode and a second duplex mode. The communications manager 420 may be configured as or otherwise support a means for receiving scheduling information based on the capability of the UE for supporting the first duplex mode and the mode switching latency. The communications manager 420 may be configured as or otherwise support a means for communicating with a base station based on the scheduling information.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced power consumption, and more efficient utilization of communication resources.

Figure 5:
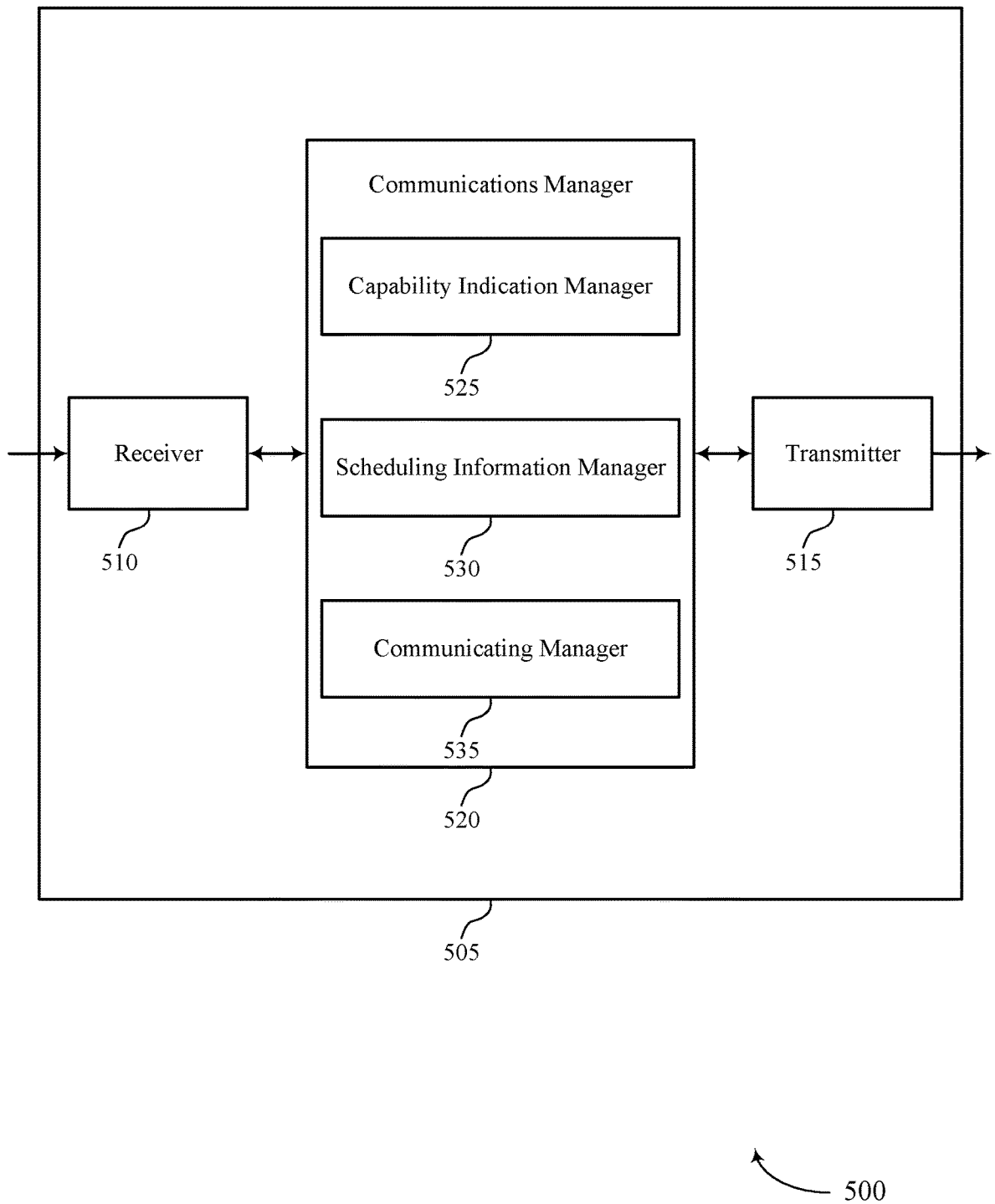

FIG. 5 shows a block diagram 500 of a device 505 that supports techniques for indicating duplex mode capability in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for indicating duplex mode capability). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for indicating duplex mode capability). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for indicating duplex mode capability as described herein. For example, the communications manager 520 may include a capability indication manager 525, a scheduling information manager 530, a communicating manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The capability indication manager 525 may be configured as or otherwise support a means for transmitting control signaling indicating a capability of the UE for supporting a first duplex mode and indicating a mode switching latency of the UE for switching between the first duplex mode and a second duplex mode. The scheduling information manager 530 may be configured as or otherwise support a means for receiving scheduling information based on the capability of the UE for supporting the first duplex mode and the mode switching latency. The communicating manager 535 may be configured as or otherwise support a means for communicating with a base station based on the scheduling information.

Figure 6:
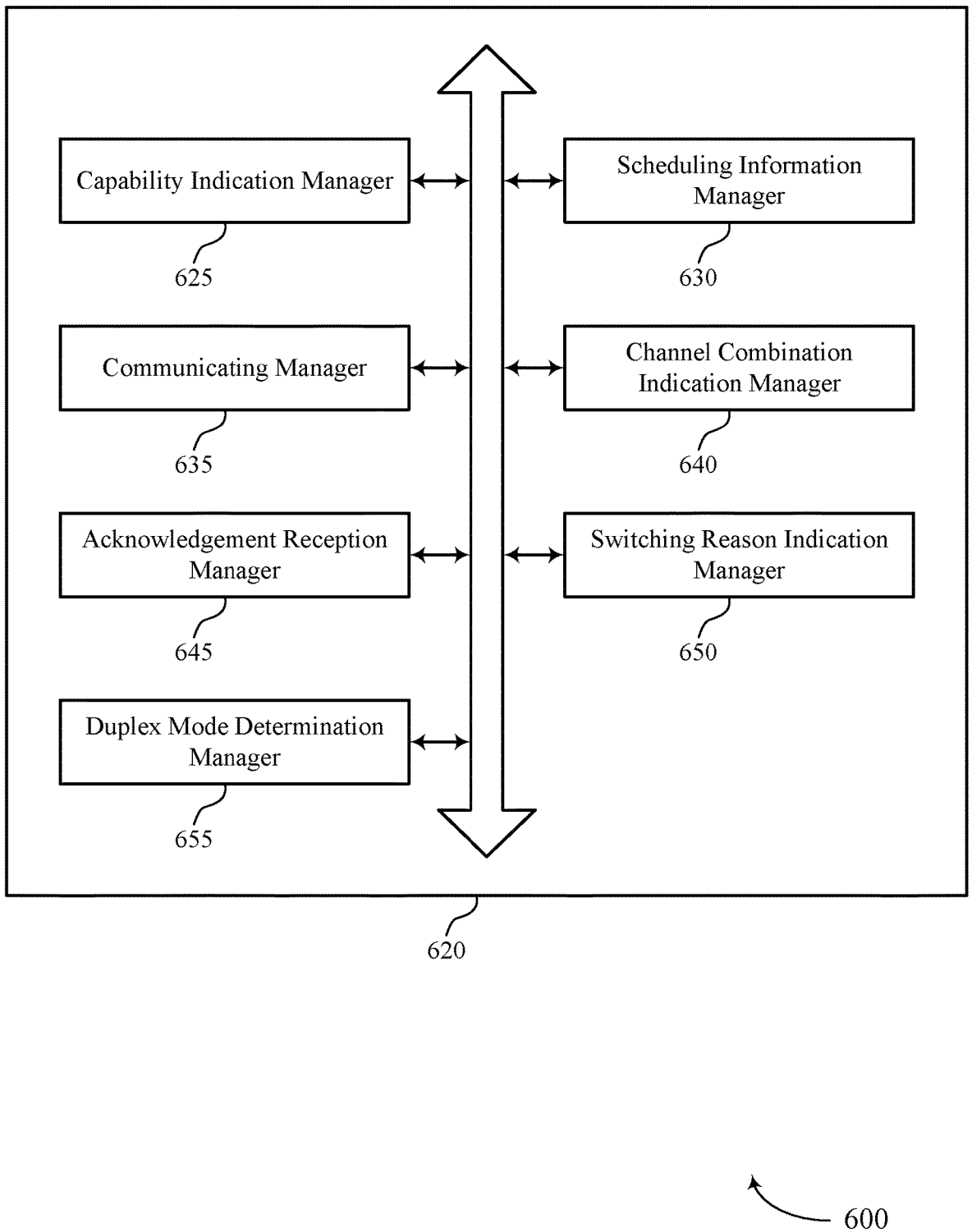
FIG. 6 shows a block diagram of a communications manager that supports techniques for indicating duplex mode capability in accordance with aspects of the present disclosure.

FIG. 6 shows a block diagram 600 of a communications manager 620 that supports techniques for indicating duplex mode capability in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for indicating duplex mode capability as described herein. For example, the communications manager 620 may include a capability indication manager 625, a scheduling information manager 630, a communicating manager 635, a channel combination indication manager 640, an acknowledgement reception manager 645, a switching reason indication manager 650, a duplex mode determination manager 655, or any combination thereof. Each of these components may communicate, directly or indirectly, with one another (e.g., via one or more buses).

The communications manager 620 may support wireless communications at a UE in accordance with examples as disclosed herein. The capability indication manager 625 may be configured as or otherwise support a means for transmitting control signaling indicating a capability of the UE for supporting a first duplex mode and indicating a mode switching latency of the UE for switching between the first duplex mode and a second duplex mode. The scheduling information manager 630 may be configured as or otherwise support a means for receiving scheduling information based on the capability of the UE for supporting the first duplex mode and the mode switching latency. The communicating manager 635 may be configured as or otherwise support a means for communicating with a base station based on the scheduling information.

In some examples, to support transmitting the control signaling, the channel combination indication manager 640 may be configured as or otherwise support a means for transmitting an indication of a set of supported full-duplex channel combinations, where each channel combination of the set of supported full-duplex channel combinations includes an uplink channel and a downlink channel.

In some examples, the UE is configured with a table of channel combinations, each channel combination in the table associated with an index. In some examples, transmitting the indication of the set of supported full-duplex channel combinations includes transmitting a set of indices associated with the set of supported full-duplex channel combinations.

In some examples, to support transmitting the control signaling, the capability indication manager 625 may be configured as or otherwise support a means for transmitting an indication of a duration for which the capability of the UE for supporting the first duplex mode is applicable.

In some examples, the duration includes a configured time window.

In some examples, the duration includes a time between transmission of the control signaling indicating the capability of the UE for supporting the first full-duplex mode and transmission of subsequent control signaling.

In some examples, the capability indication manager 625 may be configured as or otherwise support a means for receiving control signaling indicating a capability of the base station for supporting the first duplex mode and indicating a mode switching latency of the base station for switching between the first duplex mode and the second duplex mode.

In some examples, the acknowledgement reception manager 645 may be configured as or otherwise support a means for receiving, from the base station, a message acknowledging the capability of the UE for supporting the first duplex mode.

In some examples, the switching reason indication manager 650 may be configured as or otherwise support a means for transmitting an indication of a reason for switching between the first duplex mode and the second duplex mode.

In some examples, the mode switching latency is based on a directionality of duplex mode switching, the mode switching latency including a first mode switching latency associated with switching from the first duplex mode to the second duplex mode and including a second mode switching latency associated with switching from the second duplex mode to the first duplex mode.

In some examples, the capability of the UE for supporting the first duplex mode is dynamic.

In some examples, the duplex mode determination manager 655 may be configured as or otherwise support a means for determining to switch from the second duplex mode to the first duplex mode, where transmitting the control signaling indicating the capability of the UE for supporting the first duplex mode is based on the determining.

In some examples, determining to switch from the second duplex mode to the first duplex mode is based on a condition of one or more antenna panels of the UE.

In some examples, the control signaling includes a first message associated with indicating the capability of the UE for supporting the first duplex mode and a second message associated indicating the mode switching latency, the first message and the second message are transmitted separately.

In some examples, to support transmitting the control signaling, the capability indication manager 625 may be configured as or otherwise support a means for transmitting the control signaling in an RRC message, a medium access control (MAC) control element (MAC-CE) message, or an uplink control information (UCI) message, where the capability of the UE is included in a new field, in unused bits of an existing field, in a new uplink control information format, or a combination thereof.

Figure 7:
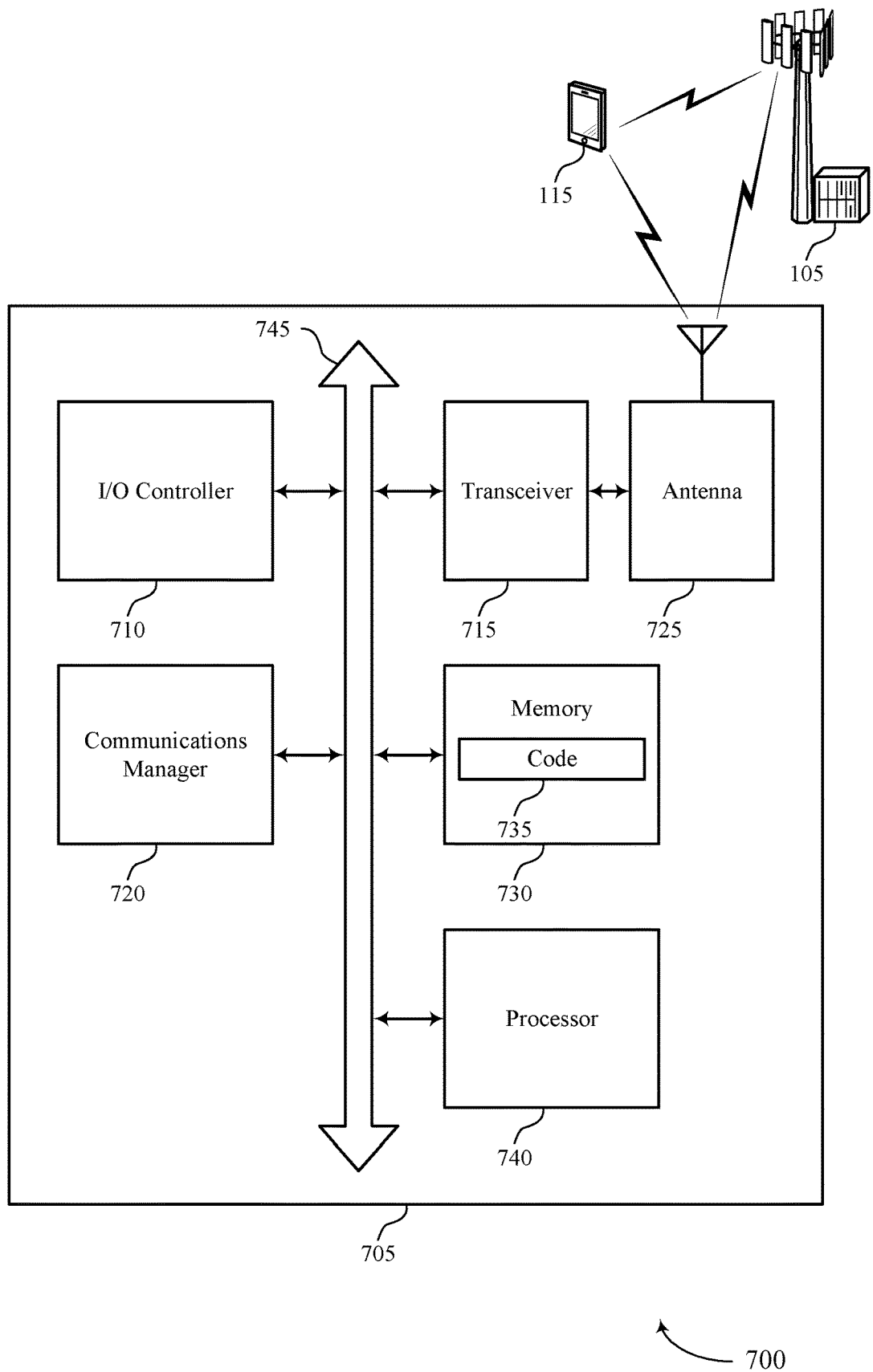
FIG. 7 shows a diagram of a system including a device that supports techniques for indicating duplex mode capability in accordance with aspects of the present disclosure.

FIG. 7 shows a diagram of a system 700 including a device 705 that supports techniques for indicating duplex mode capability in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for indicating duplex mode capability). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for transmitting control signaling indicating a capability of the UE for supporting a first duplex mode and indicating a mode switching latency of the UE for switching between the first duplex mode and a second duplex mode. The communications manager 720 may be configured as or otherwise support a means for receiving scheduling information based on the capability of the UE for supporting the first duplex mode and the mode switching latency. The communications manager 720 may be configured as or otherwise support a means for communicating with a base station based on the scheduling information.

By including or configuring the communications manager 720 in accordance with examples as described herein, the device 705 may support techniques for improved communication reliability, reduced power consumption, more efficient utilization of communication resources, improved coordination between devices, longer battery life, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for indicating duplex mode capability as described herein, or the processor 740 and the memory 730 may be otherwise configured to perform or support such operations.

Figure 8:
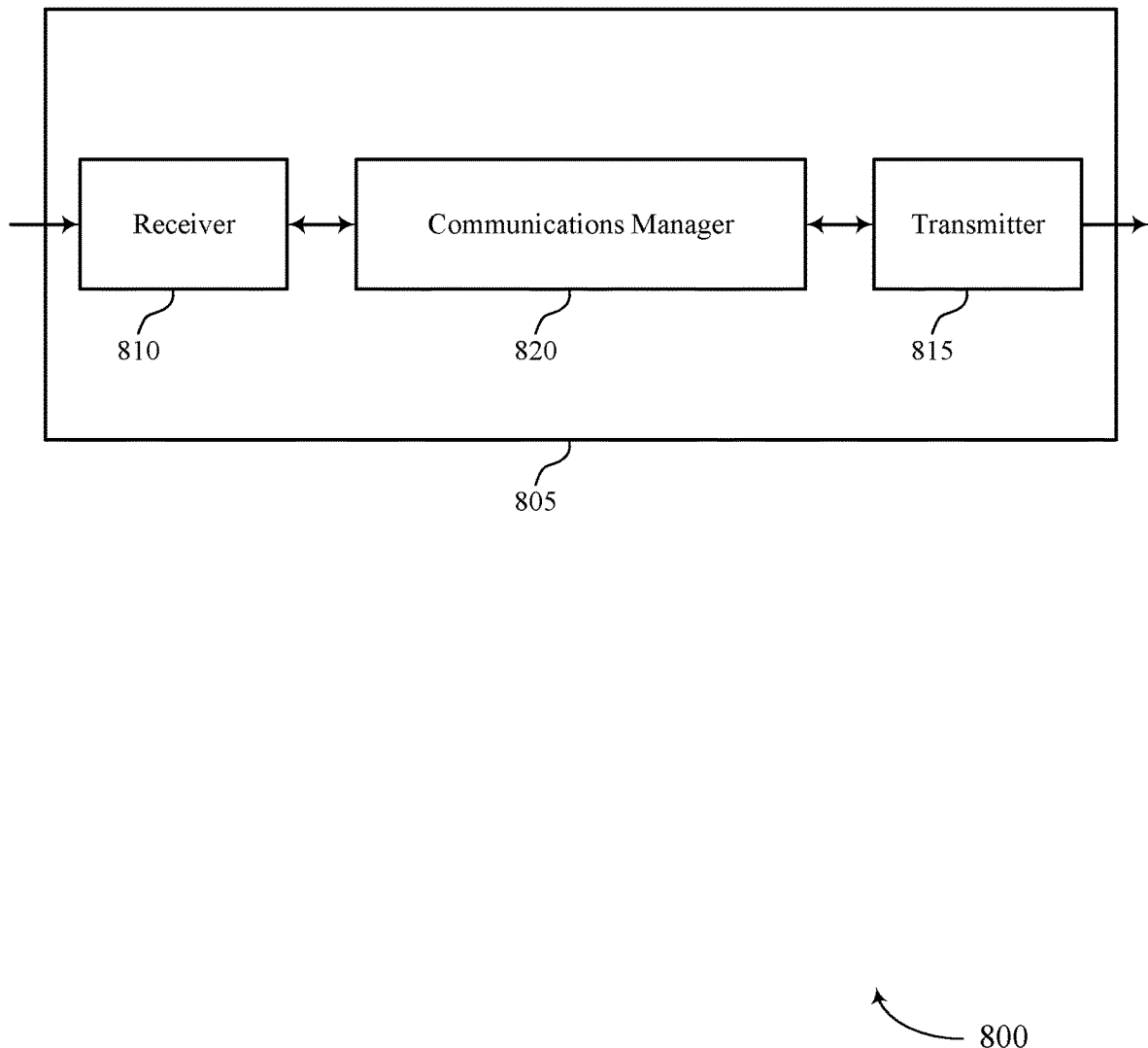
FIGS. 8 and 9 show block diagrams of devices that support techniques for indicating duplex mode capability in accordance with aspects of the present disclosure.

FIG. 8 shows a block diagram 800 of a device 805 that supports techniques for indicating duplex mode capability in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for indicating duplex mode capability). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for indicating duplex mode capability). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for indicating duplex mode capability as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for receiving control signaling indicating a capability of a UE for supporting a first duplex mode and indicating a mode switching latency of the UE for switching between the first duplex mode and a second duplex mode. The communications manager 820 may be configured as or otherwise support a means for transmitting scheduling information based on the capability of the UE for supporting the first duplex mode and the mode switching latency. The communications manager 820 may be configured as or otherwise support a means for communicating with the UE based on the scheduling information.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced power consumption, more efficient utilization of communication resources.

Figure 9:
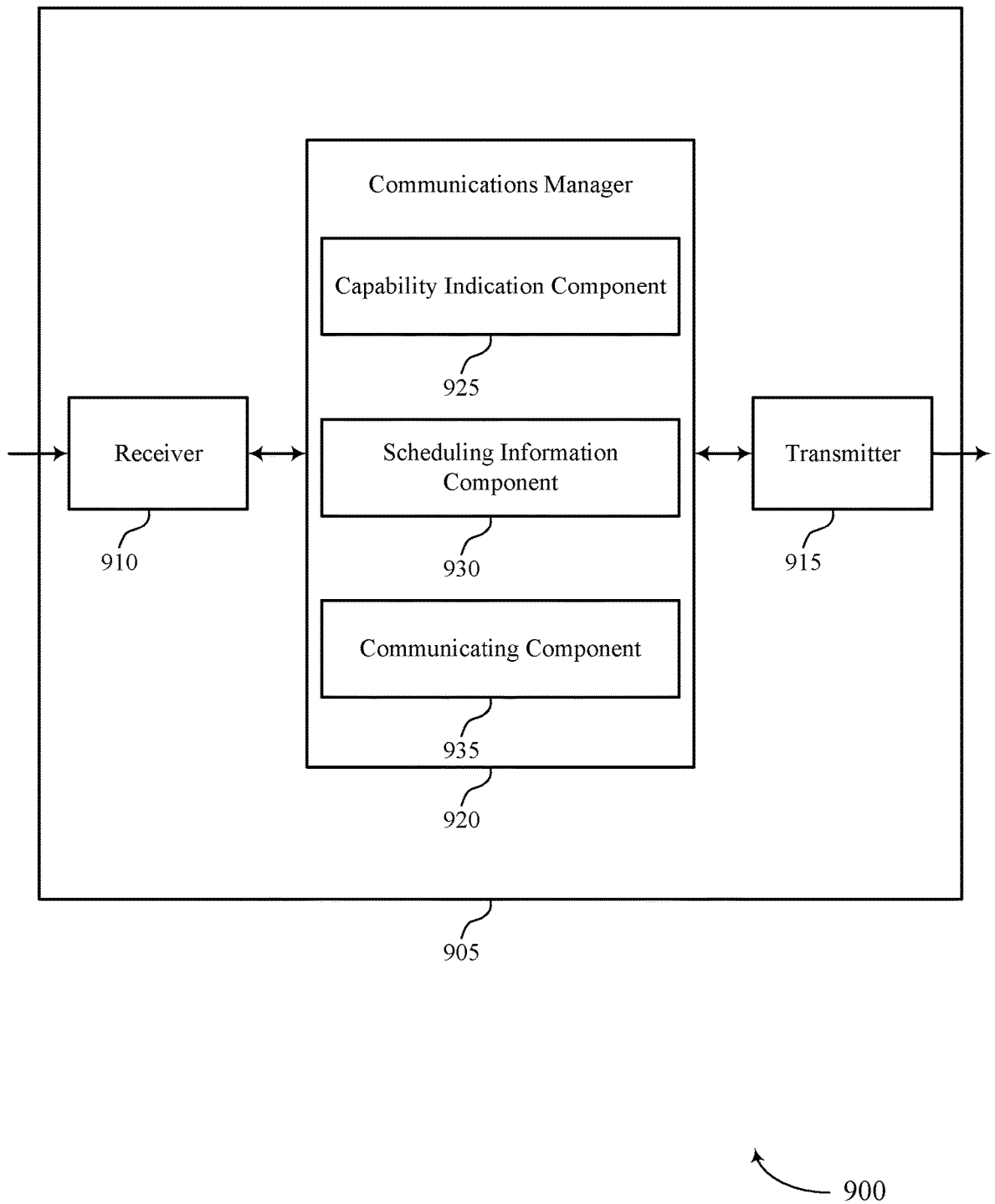

FIG. 9 shows a block diagram 900 of a device 905 that supports techniques for indicating duplex mode capability in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for indicating duplex mode capability). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for indicating duplex mode capability). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for indicating duplex mode capability as described herein. For example, the communications manager 920 may include a capability indication component 925, a scheduling information component 930, a communicating component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The capability indication component 925 may be configured as or otherwise support a means for receiving control signaling indicating a capability of a UE for supporting a first duplex mode and indicating a mode switching latency of the UE for switching between the first duplex mode and a second duplex mode. The scheduling information component 930 may be configured as or otherwise support a means for transmitting scheduling information based on the capability of the UE for supporting the first duplex mode and the mode switching latency. The communicating component 935 may be configured as or otherwise support a means for communicating with the UE based on the scheduling information.

Figure 10:
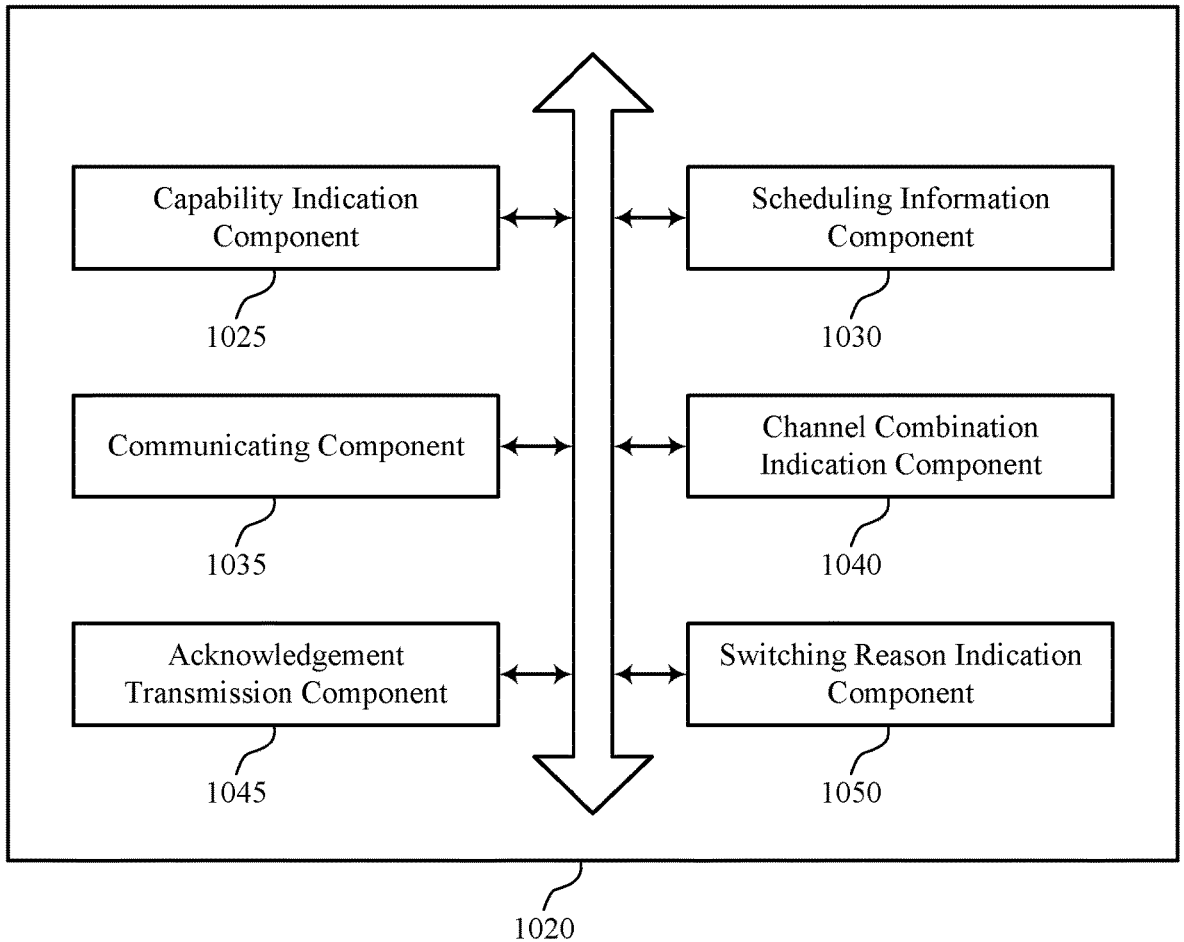
FIG. 10 shows a block diagram of a communications manager that supports techniques for indicating duplex mode capability in accordance with aspects of the present disclosure.

FIG. 10 shows a block diagram 1000 of a communications manager 1020 that supports techniques for indicating duplex mode capability in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for indicating duplex mode capability as described herein. For example, the communications manager 1020 may include a capability indication component 1025, a scheduling information component 1030, a communicating component 1035, a channel combination indication component 1040, an acknowledgement transmission component 1045, a switching reason indication component 1050, or any combination thereof. Each of these components may communicate, directly or indirectly, with one another (e.g., via one or more buses).

The communications manager 1020 may support wireless communications at a base station in accordance with examples as disclosed herein. The capability indication component 1025 may be configured as or otherwise support a means for receiving control signaling indicating a capability of a UE for supporting a first duplex mode and indicating a mode switching latency of the UE for switching between the first duplex mode and a second duplex mode. The scheduling information component 1030 may be configured as or otherwise support a means for transmitting scheduling information based on the capability of the UE for supporting the first duplex mode and the mode switching latency. The communicating component 1035 may be configured as or otherwise support a means for communicating with the UE based on the scheduling information.

In some examples, to support receiving the control signaling, the channel combination indication component 1040 may be configured as or otherwise support a means for receiving an indication of a set of supported full-duplex channel combinations, where each channel combination of the set of supported full-duplex channel combinations includes an uplink channel and a downlink channel.

In some examples, the base station is configured with a table of channel combinations, each channel combination in the table associated with an index. In some examples, receiving the indication of the set of supported full-duplex channel combinations includes receiving a set of indices associated with the set of supported full-duplex channel combinations.

In some examples, to support receiving the control signaling, the capability indication component 1025 may be configured as or otherwise support a means for receiving an indication of a duration for which the capability of the UE for supporting the first duplex mode is applicable.

In some examples, the duration includes a configured time window.

In some examples, the duration includes a time between transmission of the control signaling indicating the capability of the UE for supporting the first full-duplex mode and transmission of subsequent control signaling.

In some examples, the capability indication component 1025 may be configured as or otherwise support a means for transmitting control signaling indicating a capability of the base station for supporting the first duplex mode and indicating a mode switching latency of the base station for switching between the first duplex mode and the second duplex mode.

In some examples, the capability of the base station for supporting the first duplex mode is dynamic.

In some examples, the acknowledgement transmission component 1045 may be configured as or otherwise support a means for transmitting, to the UE, a message acknowledging the capability of the UE for supporting the first duplex mode.

In some examples, the switching reason indication component 1050 may be configured as or otherwise support a means for receiving an indication of a reason for switching between the first duplex mode and the second duplex mode.

In some examples, the mode switching latency is based on a directionality of duplex mode switching, the mode switching latency including a first mode switching latency associated with switching from the first duplex mode to the second duplex mode and including a second mode switching latency associated with switching from the second duplex mode to the first duplex mode.

In some examples, the control signaling includes a first message associated with indicating the capability of the UE for supporting the first duplex mode and a second message associated indicating the mode switching latency, the first message and the second message are transmitted separately.

In some examples, to support receiving the control signaling, the capability indication component 1025 may be configured as or otherwise support a means for receiving the control signaling in an RRC message, a medium access control (MAC) control element (MAC-CE) message, or an uplink control information (UCI) message, where the capability of the UE is included in a new field, in unused bits of an existing field, in a new uplink control information format, or a combination thereof.

Figure 11:
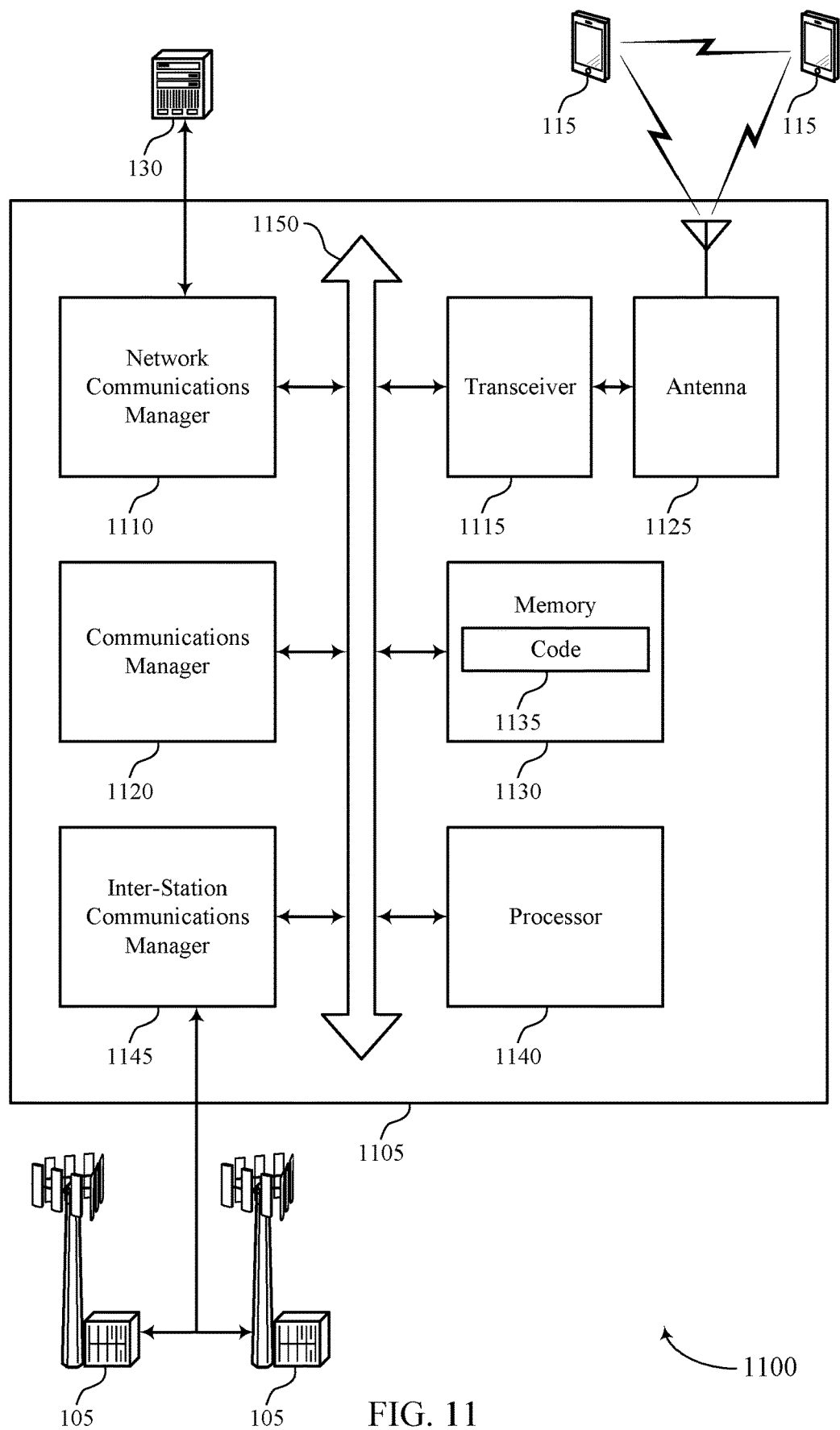
FIG. 11 shows a diagram of a system including a device that supports techniques for indicating duplex mode capability in accordance with aspects of the present disclosure.

FIG. 11 shows a diagram of a system 1100 including a device 1105 that supports techniques for indicating duplex mode capability in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for indicating duplex mode capability). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for receiving control signaling indicating a capability of a UE for supporting a first duplex mode and indicating a mode switching latency of the UE for switching between the first duplex mode and a second duplex mode. The communications manager 1120 may be configured as or otherwise support a means for transmitting scheduling information based on the capability of the UE for supporting the first duplex mode and the mode switching latency. The communications manager 1120 may be configured as or otherwise support a means for communicating with the UE based on the scheduling information.

By including or configuring the communications manager 1120 in accordance with examples as described herein, the device 1105 may support techniques for improved communication reliability, improved user experience related to reduced processing, reduced power consumption, more efficient utilization of communication resources, improved coordination between devices, longer battery life, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for indicating duplex mode capability as described herein, or the processor 1140 and the memory 1130 may be otherwise configured to perform or support such operations.

Figure 12:
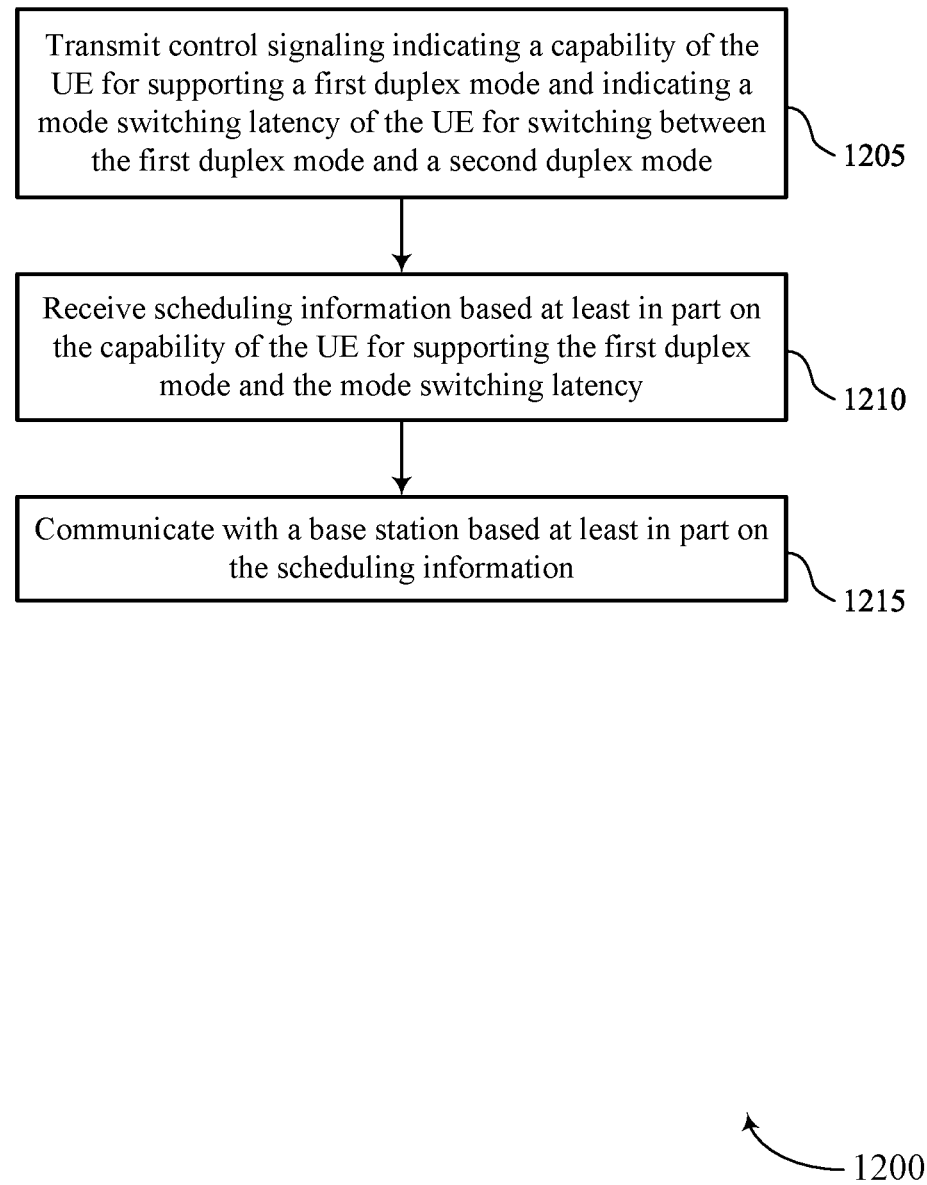
FIGS. 12 through 15 show flowcharts illustrating methods that support techniques for indicating duplex mode capability in accordance with aspects of the present disclosure.

FIG. 12 shows a flowchart illustrating a method 1200 that supports techniques for indicating duplex mode capability in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include transmitting control signaling indicating a capability of the UE for supporting a first duplex mode and indicating a mode switching latency of the UE for switching between the first duplex mode and a second duplex mode. The operations of 1205 may be performed in accordance with examples as disclosed herein. In some examples, aspects of the operations of 1205 may be performed by a capability indication manager 625 as described with reference to FIG. 6.

At 1210, the method may include receiving scheduling information based on the capability of the UE for supporting the first duplex mode and the mode switching latency. The operations of 1210 may be performed in accordance with examples as disclosed herein. In some examples, aspects of the operations of 1210 may be performed by a scheduling information manager 630 as described with reference to FIG. 6.

At 1215, the method may include communicating with a base station based on the scheduling information. The operations of 1215 may be performed in accordance with examples as disclosed herein. In some examples, aspects of the operations of 1215 may be performed by a communicating manager 635 as described with reference to FIG. 6.

Figure 13:
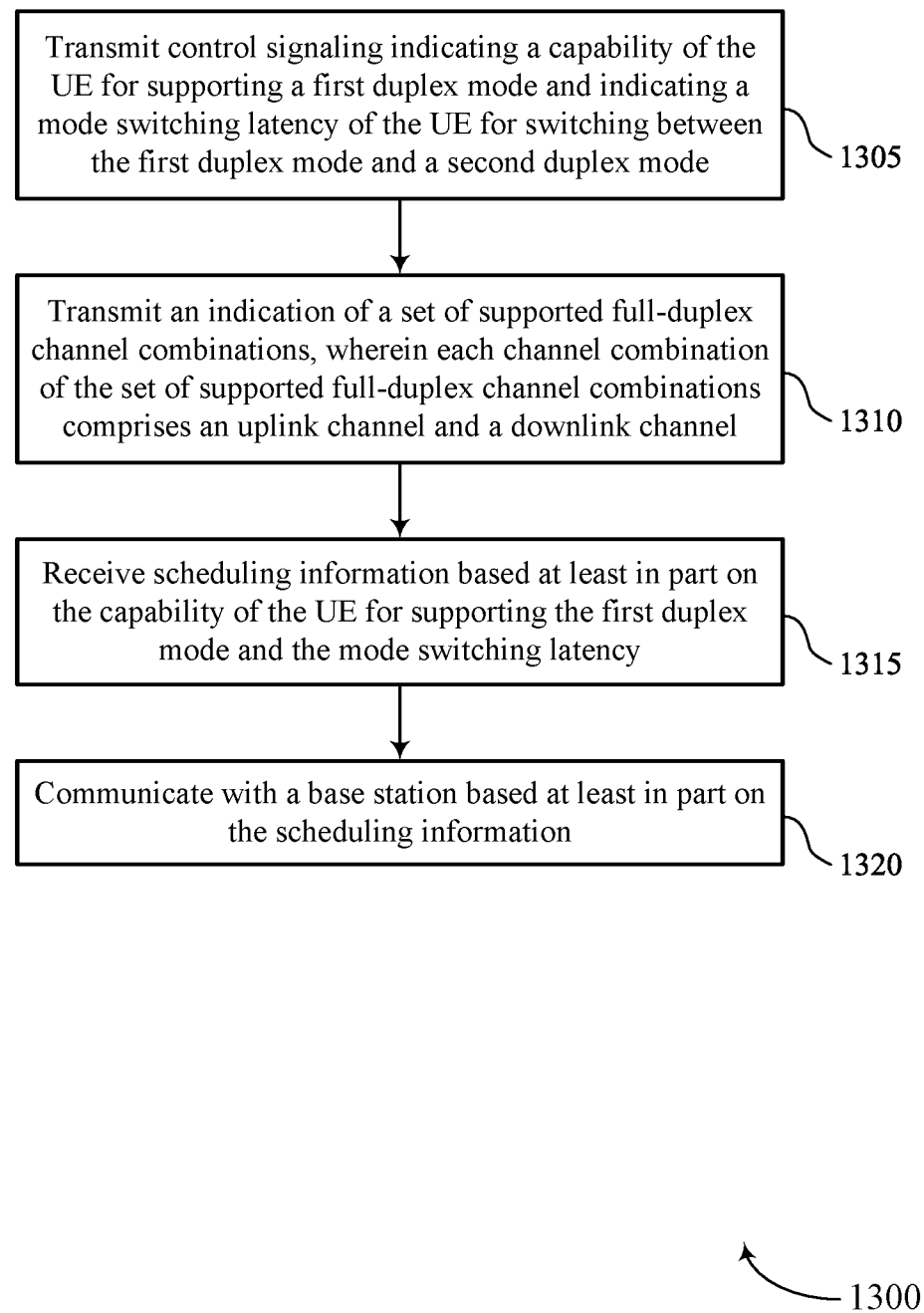

FIG. 13 shows a flowchart illustrating a method 1300 that supports techniques for indicating duplex mode capability in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include transmitting control signaling indicating a capability of the UE for supporting a first duplex mode and indicating a mode switching latency of the UE for switching between the first duplex mode and a second duplex mode. The operations of 1305 may be performed in accordance with examples as disclosed herein. In some examples, aspects of the operations of 1305 may be performed by a capability indication manager 625 as described with reference to FIG. 6.

At 1310, the method may include transmitting an indication of a set of supported full-duplex channel combinations, where each channel combination of the set of supported full-duplex channel combinations includes an uplink channel and a downlink channel. The operations of 1310 may be performed in accordance with examples as disclosed herein. In some examples, aspects of the operations of 1310 may be performed by a channel combination indication manager 640 as described with reference to FIG. 6.

At 1315, the method may include receiving scheduling information based on the capability of the UE for supporting the first duplex mode and the mode switching latency. The operations of 1315 may be performed in accordance with examples as disclosed herein. In some examples, aspects of the operations of 1315 may be performed by a scheduling information manager 630 as described with reference to FIG. 6.

At 1320, the method may include communicating with a base station based on the scheduling information. The operations of 1320 may be performed in accordance with examples as disclosed herein. In some examples, aspects of the operations of 1320 may be performed by a communicating manager 635 as described with reference to FIG. 6.

Figure 14:
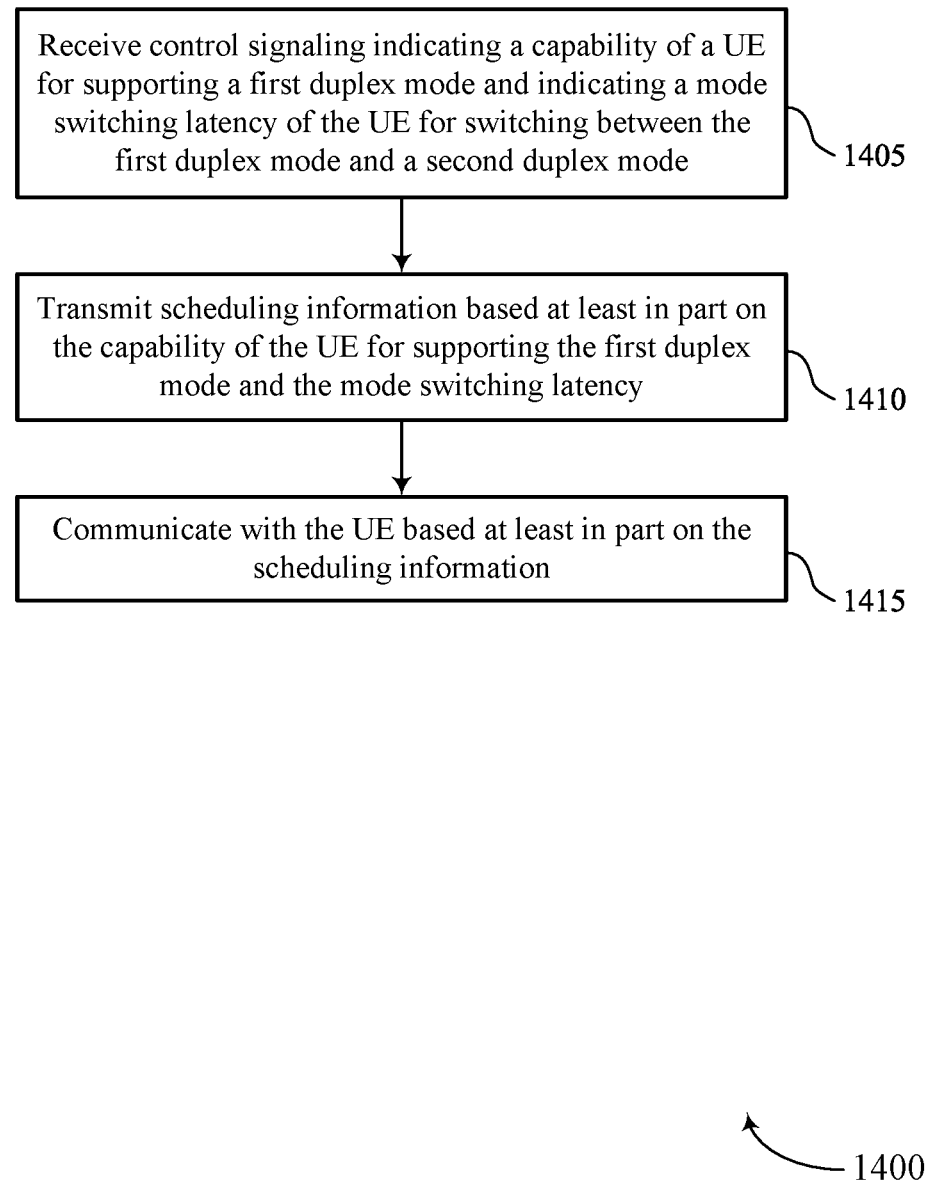

FIG. 14 shows a flowchart illustrating a method 1400 that supports techniques for indicating duplex mode capability in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include receiving control signaling indicating a capability of a UE for supporting a first duplex mode and indicating a mode switching latency of the UE for switching between the first duplex mode and a second duplex mode. The operations of 1405 may be performed in accordance with examples as disclosed herein. In some examples, aspects of the operations of 1405 may be performed by a capability indication component 1025 as described with reference to FIG. 10.

At 1410, the method may include transmitting scheduling information based on the capability of the UE for supporting the first duplex mode and the mode switching latency. The operations of 1410 may be performed in accordance with examples as disclosed herein. In some examples, aspects of the operations of 1410 may be performed by a scheduling information component 1030 as described with reference to FIG. 10.

At 1415, the method may include communicating with the UE based on the scheduling information. The operations of 1415 may be performed in accordance with examples as disclosed herein. In some examples, aspects of the operations of 1415 may be performed by a communicating component 1035 as described with reference to FIG. 10.

Figure 15:
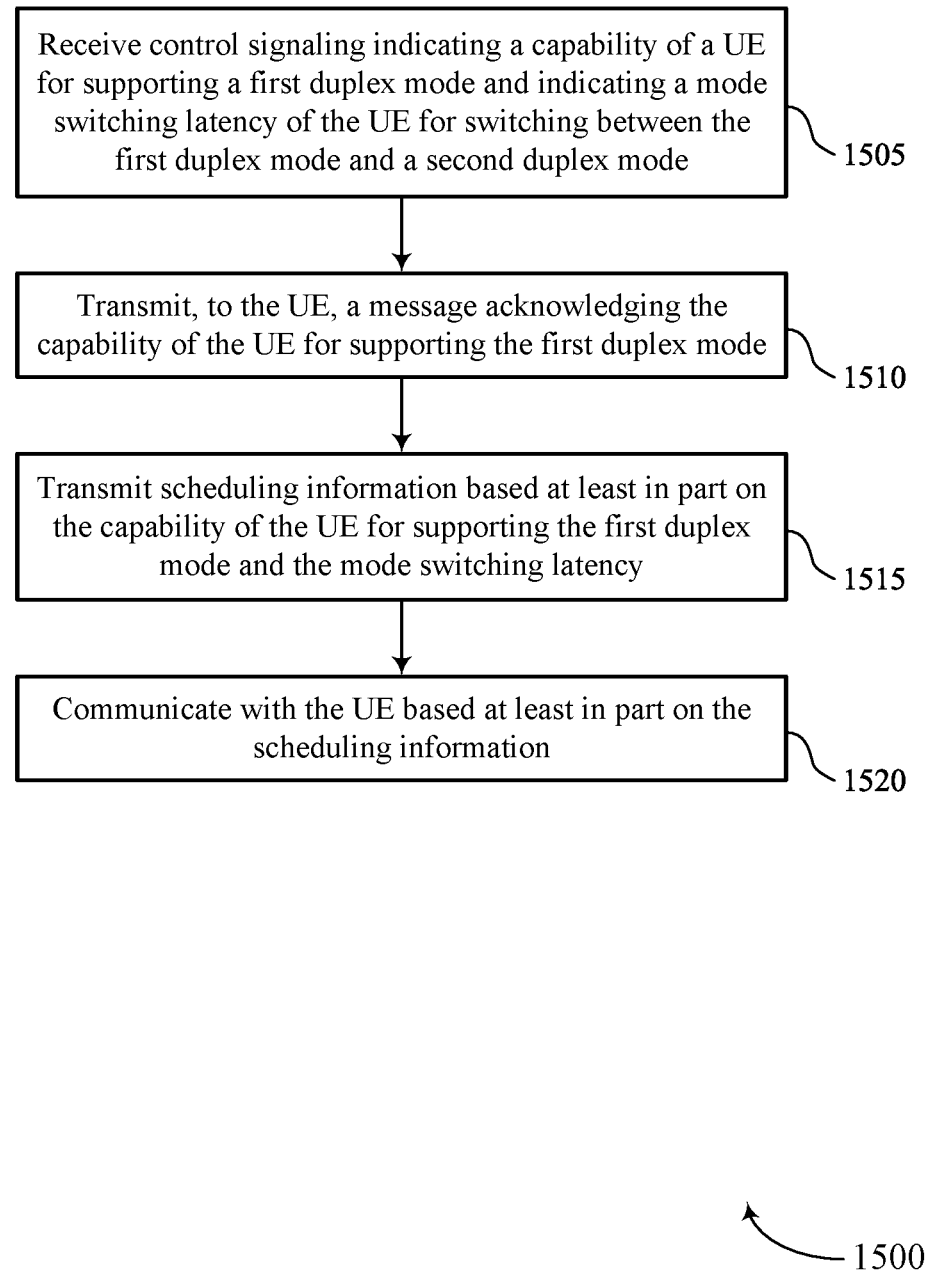

FIG. 15 shows a flowchart illustrating a method 1500 that supports techniques for indicating duplex mode capability in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving control signaling indicating a capability of a UE for supporting a first duplex mode and indicating a mode switching latency of the UE for switching between the first duplex mode and a second duplex mode. The operations of 1505 may be performed in accordance with examples as disclosed herein. In some examples, aspects of the operations of 1505 may be performed by a capability indication component 1025 as described with reference to FIG. 10.

At 1510, the method may include transmitting, to the UE, a message acknowledging the capability of the UE for supporting the first duplex mode. The operations of 1510 may be performed in accordance with examples as disclosed herein. In some examples, aspects of the operations of 1510 may be performed by an acknowledgement transmission component 1045 as described with reference to FIG. 10.

At 1515, the method may include transmitting scheduling information based on the capability of the UE for supporting the first duplex mode and the mode switching latency. The operations of 1515 may be performed in accordance with examples as disclosed herein. In some examples, aspects of the operations of 1515 may be performed by a scheduling information component 1030 as described with reference to FIG. 10.

At 1520, the method may include communicating with the UE based on the scheduling information. The operations of 1520 may be performed in accordance with examples as disclosed herein. In some examples, aspects of the operations of 1520 may be performed by a communicating component 1035 as described with reference to FIG. 10.

The following provides an overview of aspects of the present disclosure:

Aspect 1: A method for wireless communications at a UE, comprising: transmitting control signaling indicating a capability of the UE for supporting a first duplex mode and indicating a mode switching latency of the UE for switching between the first duplex mode and a second duplex mode; receiving scheduling information based at least in part on the capability of the UE for supporting the first duplex mode and the mode switching latency; and communicating with a base station based at least in part on the scheduling information.

Aspect 2: The method of aspect 1, wherein transmitting the control signaling further comprises: transmitting an indication of a set of supported full-duplex channel combinations, wherein each channel combination of the set of supported full-duplex channel combinations comprises an uplink channel and a downlink channel.

Aspect 3: The method of aspect 2, wherein the UE is configured with a table of channel combinations, each channel combination in the table associated with an index, and transmitting the indication of the set of supported full-duplex channel combinations comprises transmitting a set of indices associated with the set of supported full-duplex channel combinations.

Aspect 4: The method of any of aspects 1 through 3, wherein transmitting the control signaling further comprises: transmitting an indication of a duration for which the capability of the UE for supporting the first duplex mode is applicable.

Aspect 5: The method of aspect 4, wherein the duration comprises a configured time window.

Aspect 6: The method of any of aspects 4 through 5, wherein the duration comprises a time between transmission of the control signaling indicating the capability of the UE for supporting the first full duplex mode and transmission of subsequent control signaling.

Aspect 7: The method of any of aspects 1 through 6, further comprising: receiving control signaling indicating a capability of the base station for supporting the first duplex mode and indicating a mode switching latency of the base station for switching between the first duplex mode and the second duplex mode.

Aspect 8: The method of any of aspects 1 through 7, further comprising: receiving, from the base station, a message acknowledging the capability of the UE for supporting the first duplex mode.

Aspect 9: The method of any of aspects 1 through 8, further comprising: transmitting an indication of a reason for switching between the first duplex mode and the second duplex mode.

Aspect 10: The method of any of aspects 1 through 9, wherein the mode switching latency is based at least in part on a directionality of duplex mode switching, the mode switching latency comprising a first mode switching latency associated with switching from the first duplex mode to the second duplex mode and comprising a second mode switching latency associated with switching from the second duplex mode to the first duplex mode.

Aspect 11: The method of any of aspects 1 through 10, wherein the capability of the UE for supporting the first duplex mode is dynamic.

Aspect 12: The method of any of aspects 1 through 11, further comprising: determining to switch from the second duplex mode to the first duplex mode, wherein transmitting the control signaling indicating the capability of the UE for supporting the first duplex mode is based at least in part on the determining.

Aspect 13: The method of aspect 12, wherein determining to switch from the second duplex mode to the first duplex mode is based on a condition of one or more antenna panels of the UE.

Aspect 14: The method of any of aspects 1 through 13, wherein the control signaling comprises a first message associated with indicating the capability of the UE for supporting the first duplex mode and a second message associated indicating the mode switching latency, the first message and the second message are transmitted separately.

Aspect 15: The method of any of aspects 1 through 14, wherein transmitting the control signaling further comprises: transmitting the control signaling in an RRC message, a medium access control (MAC) control element (MAC-CE) message, or an uplink control information (UCI) message, wherein the capability of the UE is included in a new field, in unused bits of an existing field, in a new uplink control information format, or a combination thereof.

Aspect 16: A method for wireless communications at a base station, comprising: receiving control signaling indicating a capability of a UE for supporting a first duplex mode and indicating a mode switching latency of the UE for switching between the first duplex mode and a second duplex mode; transmitting scheduling information based at least in part on the capability of the UE for supporting the first duplex mode and the mode switching latency; and communicating with the UE based at least in part on the scheduling information.

Aspect 17: The method of aspect 16, wherein receiving the control signaling further comprises: receiving an indication of a set of supported full-duplex channel combinations, wherein each channel combination of the set of supported full-duplex channel combinations comprises an uplink channel and a downlink channel.

Aspect 18: The method of aspect 17, wherein the base station is configured with a table of channel combinations, each channel combination in the table associated with an index, and receiving the indication of the set of supported full-duplex channel combinations comprises receiving a set of indices associated with the set of supported full-duplex channel combinations.

Aspect 19: The method of any of aspects 16 through 18, wherein receiving the control signaling further comprises: receiving an indication of a duration for which the capability of the UE for supporting the first duplex mode is applicable.

Aspect 20: The method of aspect 19, wherein the duration comprises a configured time window.

Aspect 21: The method of any of aspects 19 through 20, wherein the duration comprises a time between transmission of the control signaling indicating the capability of the UE for supporting the first full duplex mode and transmission of subsequent control signaling.

Aspect 22: The method of any of aspects 16 through 21, further comprising: transmitting control signaling indicating a capability of the base station for supporting the first duplex mode and indicating a mode switching latency of the base station for switching between the first duplex mode and the second duplex mode.

Aspect 23: The method of aspect 22, wherein the capability of the base station for supporting the first duplex mode is dynamic.

Aspect 24: The method of any of aspects 16 through 23, further comprising: transmitting, to the UE, a message acknowledging the capability of the UE for supporting the first duplex mode.

Aspect 25: The method of any of aspects 16 through 24, further comprising: receiving an indication of a reason for switching between the first duplex mode and the second duplex mode.

Aspect 26: The method of any of aspects 16 through 25, wherein the mode switching latency is based at least in part on a directionality of duplex mode switching, the mode switching latency comprising a first mode switching latency associated with switching from the first duplex mode to the second duplex mode and comprising a second mode switching latency associated with switching from the second duplex mode to the first duplex mode.

Aspect 27: The method of any of aspects 16 through 26, wherein the control signaling comprises a first message associated with indicating the capability of the UE for supporting the first duplex mode and a second message associated indicating the mode switching latency, the first message and the second message are transmitted separately.

Aspect 28: The method of any of aspects 16 through 27, wherein receiving the control signaling further comprises: receiving the control signaling in an RRC message, a medium access control (MAC) control element (MAC-CE) message, or an uplink control information (UCI) message, wherein the capability of the UE is included in a new field, in unused bits of an existing field, in a new uplink control information format, or a combination thereof.

Aspect 29: An apparatus for wireless communications at a UE, comprising a processor; memory coupled with the processor; and instructions stored in the memory and executable by the processor to cause the apparatus to perform a method of any of aspects 1 through 15.

Aspect 30: An apparatus for wireless communications at a UE, comprising at least one means for performing a method of any of aspects 1 through 15.

Aspect 31: A non-transitory computer-readable medium storing code for wireless communications at a UE, the code comprising instructions executable by a processor to perform a method of any of aspects 1 through 15.

Aspect 32: An apparatus for wireless communications at a base station, comprising a processor; memory coupled with the processor; and instructions stored in the memory and executable by the processor to cause the apparatus to perform a method of any of aspects 16 through 28.

Aspect 33: An apparatus for wireless communications at a base station, comprising at least one means for performing a method of any of aspects 16 through 28.

Aspect 34: A non-transitory computer-readable medium storing code for wireless communications at a base station, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. A method for wireless communications at a user equipment (UE), comprising:
    transmitting control signaling indicating a capability of the UE for supporting a first duplex mode and indicat- ing a mode switching latency of the UE for switching between the first duplex mode and a second duplex mode;

transmitting, from the UE to a network device, an indication of a set of supported full-duplex channel combinations, wherein each channel combination of the set of supported full-duplex channel combinations comprises at least two channels, and wherein each of the at least two channels comprise one of an uplink channel, a downlink channel, or a sidelink channel;

receiving scheduling information based at least in part on the capability of the UE for supporting the first duplex mode and the mode switching latency and on the indication of the set of supported full-duplex channel combinations; and communicating with the network device based at least in part on the scheduling information.

2. The method of claim 1, wherein:
the UE is configured with a table of channel combinations, each channel combination in the table associated with an index, and
transmitting the indication of the set of supported full-duplex channel combinations comprises transmitting a set of indices associated with the set of supported full-duplex channel combinations.

3. The method of claim 1, wherein transmitting the control signaling further comprises:
transmitting an indication of a duration for which the capability of the UE for supporting the first duplex mode is applicable.

4. The method of claim 3, wherein the duration comprises a configured time window.

5. The method of claim 3, wherein the duration comprises a time between transmission of the control signaling indicating the capability of the UE for supporting the first duplex mode and transmission of subsequent control signaling.

6. The method of claim 1, further comprising:
receiving control signaling indicating a capability of the network device for supporting the first duplex mode and indicating a mode switching latency of the network device for switching between the first duplex mode and the second duplex mode.

7. The method of claim 1, further comprising:
receiving, from the network device, a message acknowledging the capability of the UE for supporting the first duplex mode.

8. The method of claim 1, further comprising:
transmitting an indication of a reason for switching between the first duplex mode and the second duplex mode.

9. The method of claim 1, wherein the mode switching latency is based at least in part on a directionality of duplex mode switching, the mode switching latency comprising a first mode switching latency associated with switching from the first duplex mode to the second duplex mode and comprising a second mode switching latency associated with switching from the second duplex mode to the first duplex mode.

10. The method of claim 1, wherein the capability of the UE for supporting the first duplex mode is dynamic.

11. The method of claim 1, further comprising:
determining to switch from the second duplex mode to the first duplex mode, wherein transmitting the control signaling indicating the capability of the UE for supporting the first duplex mode is based at least in part on the determining.

12. The method of claim 11, wherein determining to switch from the second duplex mode to the first duplex mode is based on a condition of one or more antenna panels of the UE.

13. The method of claim 1, wherein the control signaling comprises a first message associated with indicating the capability of the UE for supporting the first duplex mode and a second message associated indicating the mode switching latency, the first message and the second message are transmitted separately.

14. The method of claim 1, wherein transmitting the control signaling further comprises:
transmitting the control signaling in a radio resource control (RRC) message, a medium access control (MAC) control element (MAC-CE) message, or an uplink control information (UCI) message, wherein the capability of the UE is included in a new field, in unused bits of an existing field, in a new uplink control information format, or a combination thereof.

15. A method for wireless communications at a network device, comprising:
receiving control signaling indicating a capability of a user equipment (UE) for supporting a first duplex mode and indicating a mode switching latency of the UE for switching between the first duplex mode and a second duplex mode;

receiving, from the UE, an indication of a set of supported full-duplex channel combinations, wherein each channel combination of the set of supported full-duplex channel combinations comprises at least two channels, and wherein each of the at least two channels comprise one of an uplink channel, a downlink channel, or a sidelink channel;

transmitting scheduling information based at least in part on the capability of the UE for supporting the first duplex mode and the mode switching latency and on the indication of the set of supported full-duplex channel combinations; and communicating with the UE based at least in part on the scheduling information.

16. The method of claim 15, wherein:
the network device is configured with a table of channel combinations, each channel combination in the table associated with an index, and
receiving the indication of the set of supported full-duplex channel combinations comprises receiving a set of indices associated with the set of supported full-duplex channel combinations.

17. The method of claim 15, wherein receiving the control signaling further comprises:
receiving an indication of a duration for which the capability of the UE for supporting the first duplex mode is applicable.

18. The method of claim 17, wherein the duration comprises a configured time window.

19. The method of claim 17, wherein the duration comprises a time between transmission of the control signaling indicating the capability of the UE for supporting the first duplex mode and transmission of subsequent control signaling.

20. The method of claim 15, further comprising:
transmitting control signaling indicating a capability of the network device for supporting the first duplex mode and indicating a mode switching latency of the network device for switching between the first duplex mode and the second duplex mode.

21. The method of claim 20, wherein the capability of the network device for supporting the first duplex mode is dynamic.

22. The method of claim 15, further comprising:
transmitting, to the UE, a message acknowledging the capability of the UE for supporting the first duplex mode.

23. The method of claim 15, further comprising:
receiving an indication of a reason for switching between the first duplex mode and the second duplex mode.

24. The method of claim 15, wherein the mode switching latency is based at least in part on a directionality of duplex mode switching, the mode switching latency comprising a first mode switching latency associated with switching from the first duplex mode to the second duplex mode and comprising a second mode switching latency associated with switching from the second duplex mode to the first duplex mode.

25. The method of claim 15, wherein the control signaling comprises a first message associated with indicating the capability of the UE for supporting the first duplex mode and a second message associated indicating the mode switching latency, the first message and the second message are transmitted separately.

26. The method of claim 15, wherein receiving the control signaling further comprises:
receiving the control signaling in a radio resource control (RRC) message, a medium access control (MAC) control element (MAC-CE) message, or an uplink control information (UCI) message, wherein the capability of the UE is included in a new field, in unused bits of an existing field, in a new uplink control information format, or a combination thereof.

27. An apparatus for wireless communications at a user equipment (UE), comprising:
a processor;
memory coupled with the processor; and
instructions stored in the memory and executable by the processor to cause the apparatus to:
transmit control signaling indicating a capability of the UE for supporting a first duplex mode and indicating a mode switching latency of the UE for switching between the first duplex mode and a second duplex mode;
transmit, from the UE to a network device, an indication of a set of supported full-duplex channel combinations, wherein each channel combination of the set of supported full-duplex channel combinations comprises at least two channels, and wherein each of the at least two channels comprise one of an uplink channel a downlink channel, or a sidelink channel;
receive scheduling information based at least in part on the capability of the UE for supporting the first duplex mode and the mode switching latency and on the indication of the set of supported full-duplex channel combinations; and
communicate with the network device based at least in part on the scheduling information.

28. An apparatus for wireless communications at a network device, comprising:
a processor;
memory coupled with the processor; and
instructions stored in the memory and executable by the processor to cause the apparatus to:
receive control signaling indicating a capability of a user equipment (UE) for supporting a first duplex mode and indicating a mode switching latency of the UE for switching between the first duplex mode and a second duplex mode;
receive, from the UE, an indication of a set of supported full-duplex channel combinations, wherein each channel combination of the set of supported full-duplex channel combinations comprises at least two channels, and wherein each of the at least two channels comprise one of an uplink channel, a downlink channel, or a sidelink channel;
transmit scheduling information based at least in part on the capability of the UE for supporting the first duplex mode and the mode switching latency and on the indication of the set of supported full-duplex channel combinations; and
communicate with the UE based at least in part on the scheduling information.

* * * * *